US011923981B2

(12) United States Patent
Kim et al.

(10) Patent No.: US 11,923,981 B2
(45) Date of Patent: Mar. 5, 2024

(54) ELECTRONIC DEVICE FOR TRANSMITTING PACKETS VIA WIRELESS COMMUNICATION CONNECTION AND METHOD OF OPERATING THE SAME

(71) Applicant: SAMSUNG ELECTRONICS CO., LTD., Suwon-si (KR)

(72) Inventors: Hyunwook Kim, Suwon-si (KR); Sanghoon Lee, Suwon-si (KR); Hyunchul Yang, Suwon-si (KR); Hangil Moon, Suwon-si (KR); Kali Charan Gajula, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 17/497,308

(22) Filed: Oct. 8, 2021

(65) Prior Publication Data

US 2022/0116145 A1 Apr. 14, 2022

Related U.S. Application Data

(63) Continuation of application No. PCT/KR2021/013698, filed on Oct. 6, 2021.

(30) Foreign Application Priority Data

Oct. 8, 2020 (KR) .................. 10-2020-0130528

(51) Int. Cl.
*H04L 1/08* (2006.01)
*H04W 76/10* (2018.01)

(52) U.S. Cl.
CPC ............... *H04L 1/08* (2013.01); *H04W 76/10* (2018.02)

(58) Field of Classification Search
CPC ......... H04L 1/08; H04L 1/189; H04L 1/1819; H04W 76/10
See application file for complete search history.

(56) References Cited

U.S. PATENT DOCUMENTS 7,133,396 B1 11/2006 Schmidl et al.
11,563,829 B2 * 1/2023 Johansson ........... H04L 12/4645
(Continued)

FOREIGN PATENT DOCUMENTS

KR 10-2002-0034226 5/2002
KR 10-2003-0040424 5/2003
(Continued)

OTHER PUBLICATIONS

International Search Report and Written Opinion dated Jan. 7, 2022 in corresponding International Application No. PCT/KR2021/013698.

*Primary Examiner* — Kibrom T Hailu
(74) *Attorney, Agent, or Firm* — Nixon & Vanderhye, P.C.

(57) ABSTRACT

According to various embodiments, an electronic device may include: a transceiver; and at least one processor, wherein the at least one processor is configured to: control the electronic device to establish a wireless communication connection between the electronic device and an external electronic device, generate, by encoding a first frame included in an audio stream, multiple pieces of compressed data corresponding to the first frame, transmit a first packet, including main compressed data corresponding to the first frame from among the multiple pieces of compressed data, to the external electronic device via the transceiver based on the wireless communication connection, and based on a first signal being received from the external electronic device via the transceiver based on the wireless communication connection within a specified time after transmission of the first (Continued)

packet, transmit a second packet, including first sub-compressed data corresponding to the first frame from among the multiple pieces of compressed data, to the external electronic device via the transceiver based on the wireless communication connection.

20 Claims, 16 Drawing Sheets

(56) References Cited

U.S. PATENT DOCUMENTS

| | | | |
|---|---|---|---|
| 2002/0053058 A1 | 5/2002 | Lee et al. | |
| 2003/0031460 A1 | 2/2003 | Obrador | |
| 2006/0049966 A1* | 3/2006 | Ozawa | G10L 19/005 |
| | | | 704/E19.003 |
| 2007/0127424 A1 | 6/2007 | Kwon et al. | |
| 2007/0230501 A1 | 10/2007 | Bibby et al. | |
| 2008/0098274 A1 | 4/2008 | Kwon et al. | |
| 2008/0212582 A1 | 9/2008 | Zwart et al. | |
| 2009/0046765 A1* | 2/2009 | Xia | H04L 5/0023 |
| | | | 375/141 |
| 2010/0097967 A1 | 4/2010 | Kwon et al. | |
| 2010/0153102 A1 | 6/2010 | Yoshida | |
| 2011/0299690 A1 | 12/2011 | Lee | |
| 2013/0107895 A1* | 5/2013 | Wentink | H04W 52/0219 |
| | | | 370/477 |
| 2014/0056451 A1* | 2/2014 | El-Hoiydi | H04R 27/00 |
| | | | 381/315 |
| 2015/0016475 A1* | 1/2015 | Govindappa | H04W 28/06 |
| | | | 370/477 |
| 2016/0191181 A1 | 6/2016 | Bailey | |
| 2017/0026780 A1 | 1/2017 | Ryu | |
| 2017/0251469 A1 | 8/2017 | Lee et al. | |
| 2017/0303076 A1 | 10/2017 | Song et al. | |
| 2017/0366596 A1* | 12/2017 | Han | H04L 1/0006 |
| 2019/0045304 A1 | 2/2019 | Bhalla et al. | |
| 2020/0260322 A1 | 8/2020 | Chen | |

FOREIGN PATENT DOCUMENTS

| | | |
|---|---|---|
| KR | 10-2008-0035439 | 4/2008 |
| KR | 10-2008-0069535 | 7/2008 |
| KR | 10-2017-0011188 | 2/2017 |

* cited by examiner

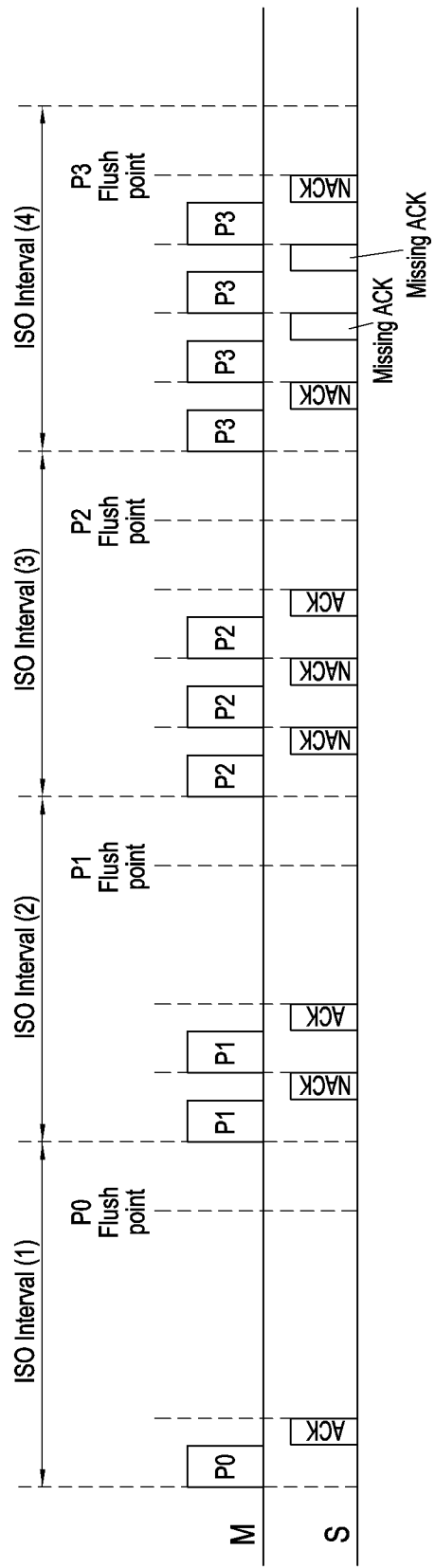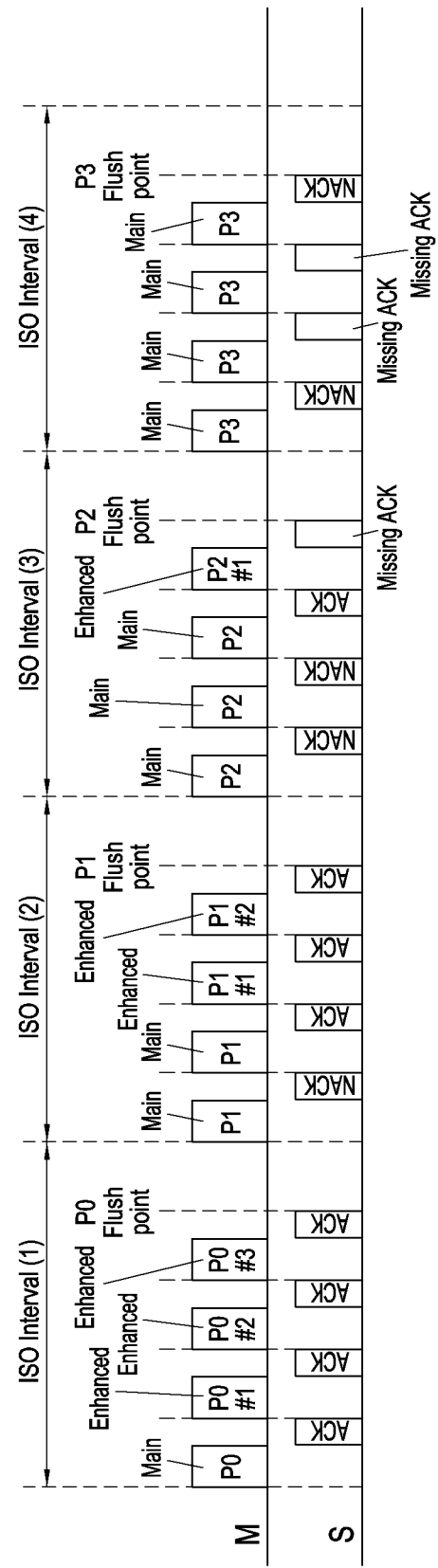
FIG.5A
FIG.5B

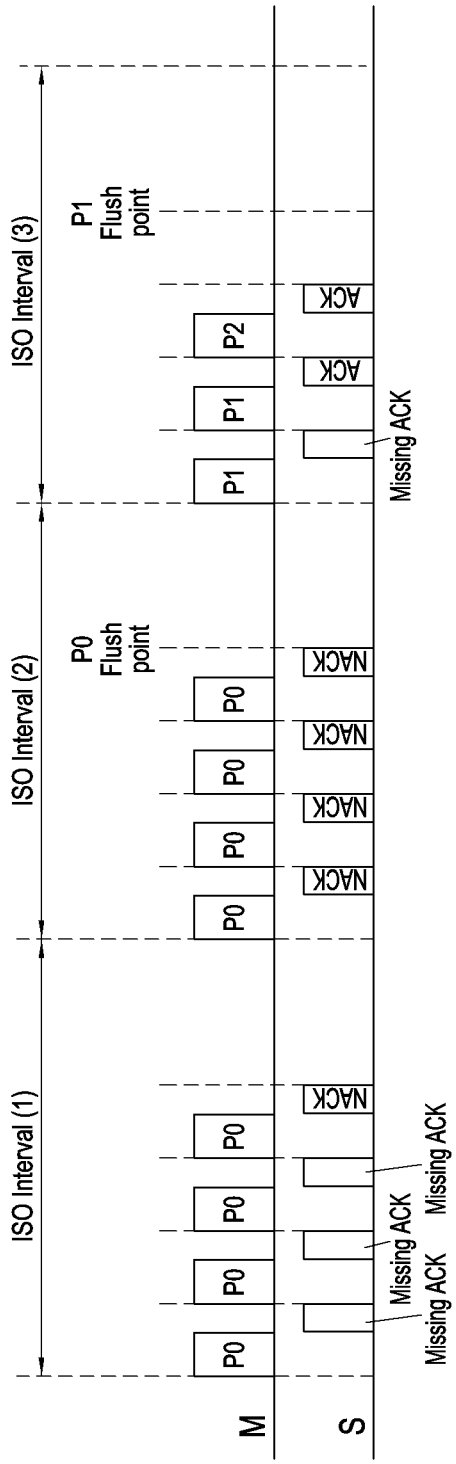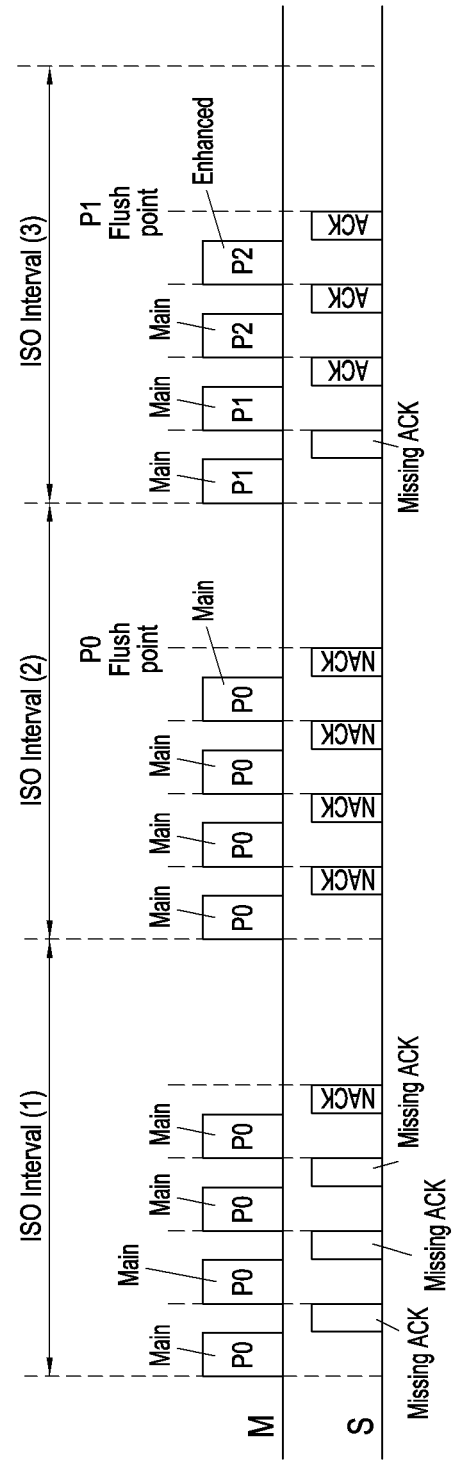
FIG.7A
FIG.7B

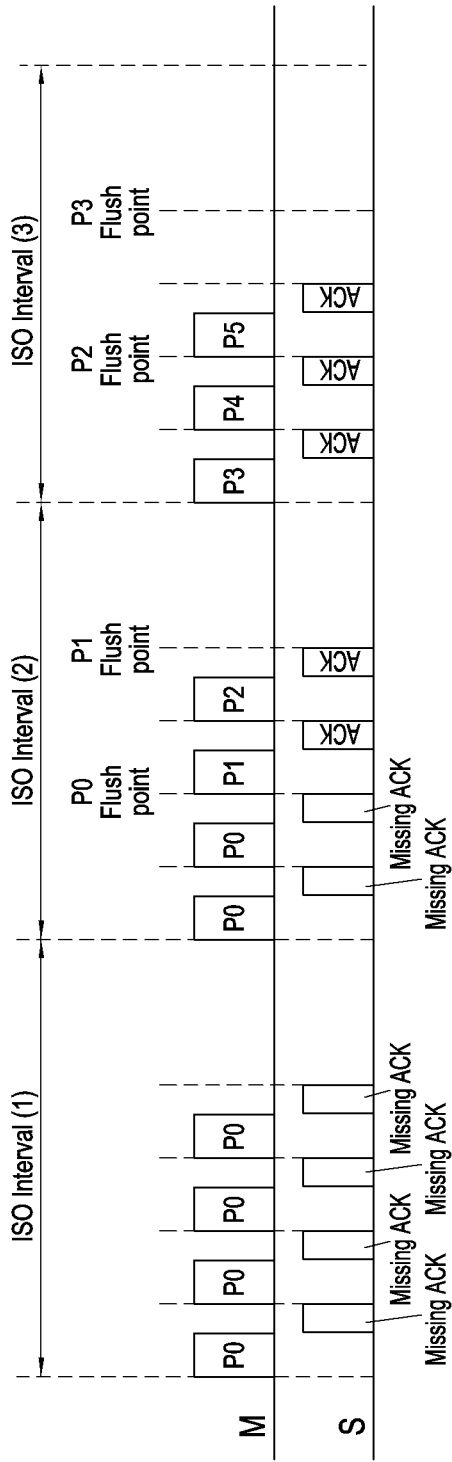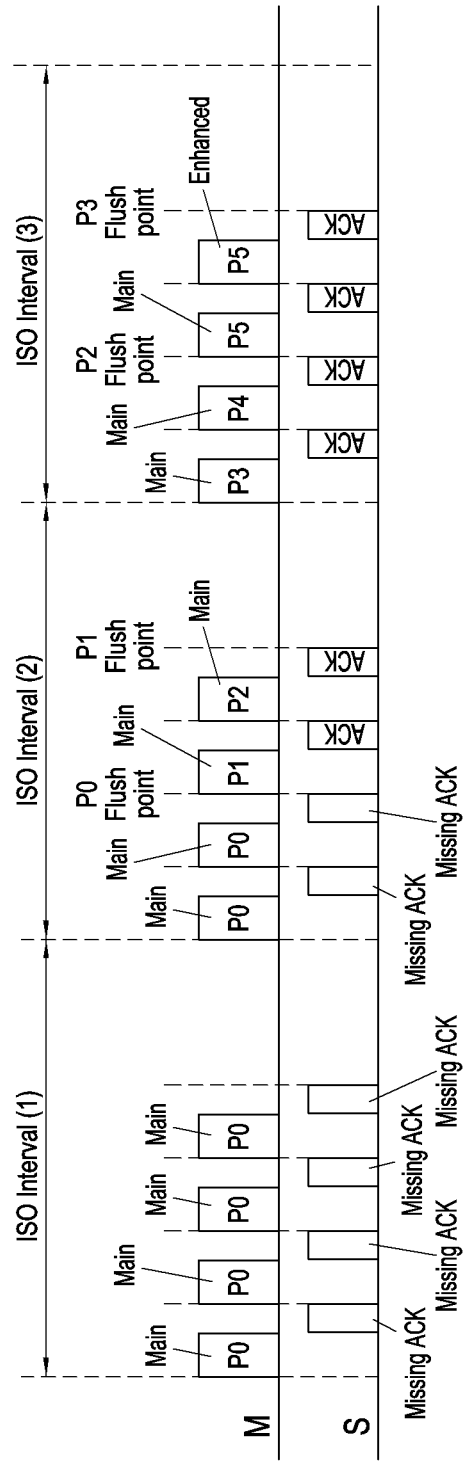
FIG. 8A
FIG. 8B

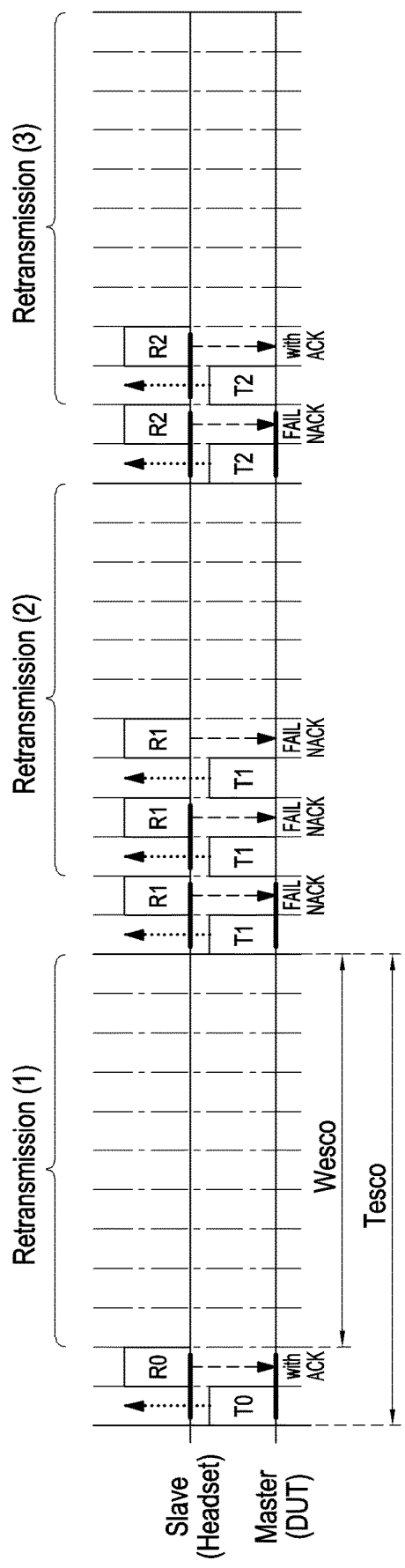
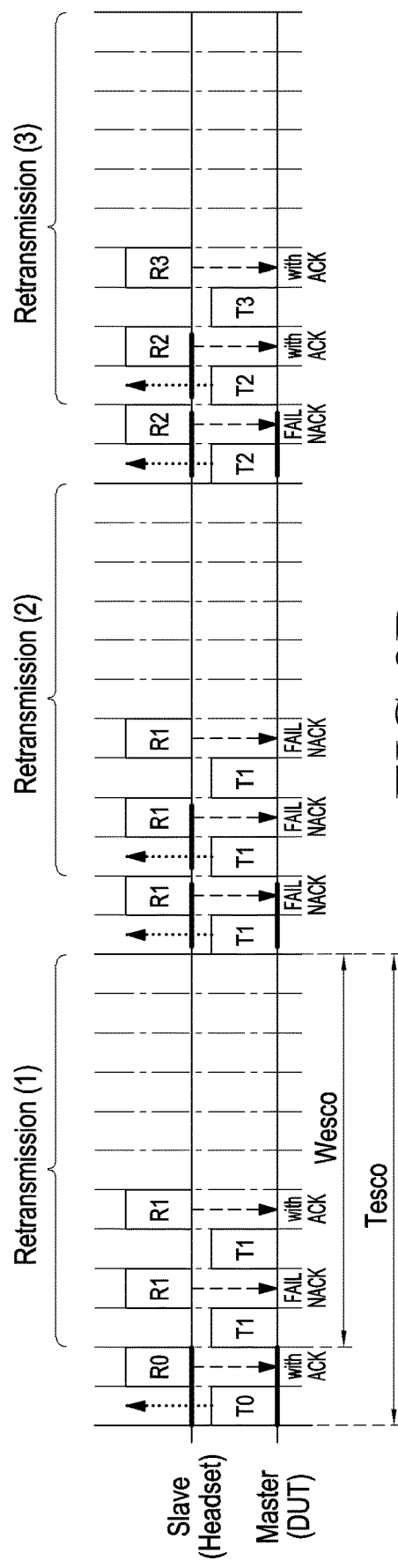
FIG.9A
FIG.9B ly used together with smartphones. In particular, in the case of headsets used for listening to music or making calls, the trend of users moving from the existing wired connection scheme to products using wireless communication technologies, such as Bluetooth, is rapidly increasing, and requirements for high-quality audio streaming, such as wired audio streaming, are increasing even in a wireless environment.

ELECTRONIC DEVICE FOR TRANSMITTING PACKETS VIA WIRELESS COMMUNICATION CONNECTION AND METHOD OF OPERATING THE SAME

CROSS-REFERENCE TO RELATED APPLICATIONS

This application is a continuation of International Application No. PCT/KR2021/013698 designating the United States, filed on Oct. 6, 2021, in the Korean Intellectual Property Receiving Office and claiming priority to Korean Patent Application No. 10-2020-0130528, filed on Oct. 8, 2020, in the Korean Intellectual Property Office, the disclosures of which are incorporated by reference herein in their entireties.

BACKGROUND

Field

The disclosure relates to an electronic device for transmitting a packet via a wireless communication connection and an operating method therefor.

Description of Related Art

As wireless communication technologies are developed, electronic devices may communicate with other electronic devices via various wireless communication technologies. With the development of wireless communication technologies, various types of wearable devices are appearing and are widely used together with smartphones. In particular, in the case of headsets used for listening to music or making calls, the trend of users moving from the existing wired connection scheme to products using wireless communication technologies, such as Bluetooth, is rapidly increasing, and requirements for high-quality audio streaming, such as wired audio streaming, are increasing even in a wireless environment.

A Bluetooth communication technology refers to a short-range wireless communication technology that enables electronic devices to exchange data or information by connecting to each other. The Bluetooth communication technology may include a Bluetooth legacy (or classic) network technology or a Bluetooth low energy (BLE) network, and may have a topology of various connection forms, such as piconet and scatternet.

In a wireless environment such as Bluetooth, because of a limited bandwidth, an audio signal is compressed in a specific compression format so as to be transmitted. If a compression rate of an audio signal is increased, less data is transmitted to a wireless headset (receiver), and there may be thus an advantage in sound cutoff, etc. However, on the contrary, more audio information is lost due to the high compression rate, and it is thus difficult to provide a high-quality audio streaming service.

In the field of the Bluetooth communication technology, there exists a profile defining a period for packet retransmission in case a packet requested to be transmitted is not transmitted. When such a profile (e.g., BLE TMAP profile or HFP profile) is used, a failure of packet transmission is prevented in a poor wireless environment by retransmission of an untransmitted packet until a predetermined time, but if a packet is successfully transmitted in a good wireless environment, a remaining retransmission window is not used, and radio resources are thus wasted.

SUMMARY

Embodiments of the disclosure provide an electronic device for transmitting a packet via a wireless communication connection and an operating method therefor in which an additional packet may be transmitted using a retransmission window of a packet.

According to various example embodiments, an electronic device may include: a transceiver; and at least one processor, wherein the at least one processor is configured to: control the electronic device to establish a wireless communication connection between the electronic device and an external electronic device, generate, by encoding a first frame included in an audio stream, multiple pieces of compressed data corresponding to the first frame, transmit a first packet, which includes main compressed data corresponding to the first frame from among the multiple pieces of compressed data, to the external electronic device via the transceiver based on the wireless communication connection, and based on an acknowledge (ACK) signal being received from the external electronic device via the transceiver based on the wireless communication connection within a specified time after transmission of the first packet, transmit a second packet, including first sub-compressed data corresponding to the first frame from among the multiple pieces of compressed data, to the external electronic device via the transceiver based on the wireless communication connection.

According to various example embodiments, an electronic device may include: a transceiver; and at least one processor, wherein the at least one processor is configured to: control the electronic device to establish a wireless communication connection between the electronic device and an external electronic device, receive a first packet, including main compressed data corresponding to a first frame included in an audio stream from among multiple pieces of compressed data generated by encoding the first frame, from the external electronic device via the transceiver based on the wireless communication connection, transmit a first acknowledge (ACK) signal to the external electronic device via the transceiver based on the wireless communication connection in response to reception of the first packet, receive a second packet, including first sub-compressed data corresponding to the first frame from among the multiple pieces of compressed data, from the external electronic device via the transceiver based on the wireless communication connection, transmit a second ACK signal to the external electronic device via the transceiver based on the wireless communication connection in response to reception of the second packet, and generate a second frame corresponding to the first frame by decoding using both the main compressed data and the first sub-compressed data.

According to various example embodiments, an electronic device may include: a transceiver; and at least one processor, wherein the at least one processor is configured to: control the electronic device to establish a wireless communication connection between the electronic device and an external electronic device, identify an initial parameter, generate multiple pieces of compressed data by encoding respective frames included in an audio stream in units of frames, determine first compressed data to be transmitted to the external electronic device from among the multiple pieces of compressed data, transmit a first packet including the first compressed data to the external electronic device via the transceiver based on the wireless communication connection, receive a transmission parameter from the external electronic device via the transceiver based on the wireless communication connection, determine second compressed data to be transmitted to the external electronic device from among the multiple pieces of compressed data on the basis of the initial parameter and the transmission parameter, and transmit a second packet including the second compressed data to the external electronic device via the transceiver based on the wireless communication connection.

According to various example embodiments, an electronic device capable of transmitting an additional packet using a packet retransmission period and an operating method therefor may be provided. Accordingly, by efficiently using the packet retransmission period, wastage of radio resources can be prevented and/or reduced, and demands for high-quality audio streaming as high as wired streaming can be satisfied even in a wireless environment.

According to various example embodiments, an electronic device and an operation method therefor can be provided, the electronic device being capable of transmitting, in a period in which a packet assigned thereto has been transmitted, a packet scheduled to be transmitted in a next period. Accordingly, the continuity of wireless data transmission can be ensured by preventing and/or reducing a packet from being untransmitted.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 5A and 5B are diagrams illustrating an example method for transmitting data to or receiving data from the external electronic device by the electronic device according to various embodiments;

FIGS. 7A and 7B are diagrams illustrating an example method for transmitting data to or receiving data from the external electronic device by the electronic device according to various embodiments;

FIGS. 8A and 8B are diagrams illustrating an example method for transmitting data to or receiving data from the external electronic device by the electronic device according to various embodiments;

FIGS. 9A and 9B are diagrams illustrating an example method for transmitting data to or receiving data from the external electronic device by the electronic device according to various embodiments;

DETAILED DESCRIPTION

Figure 1:
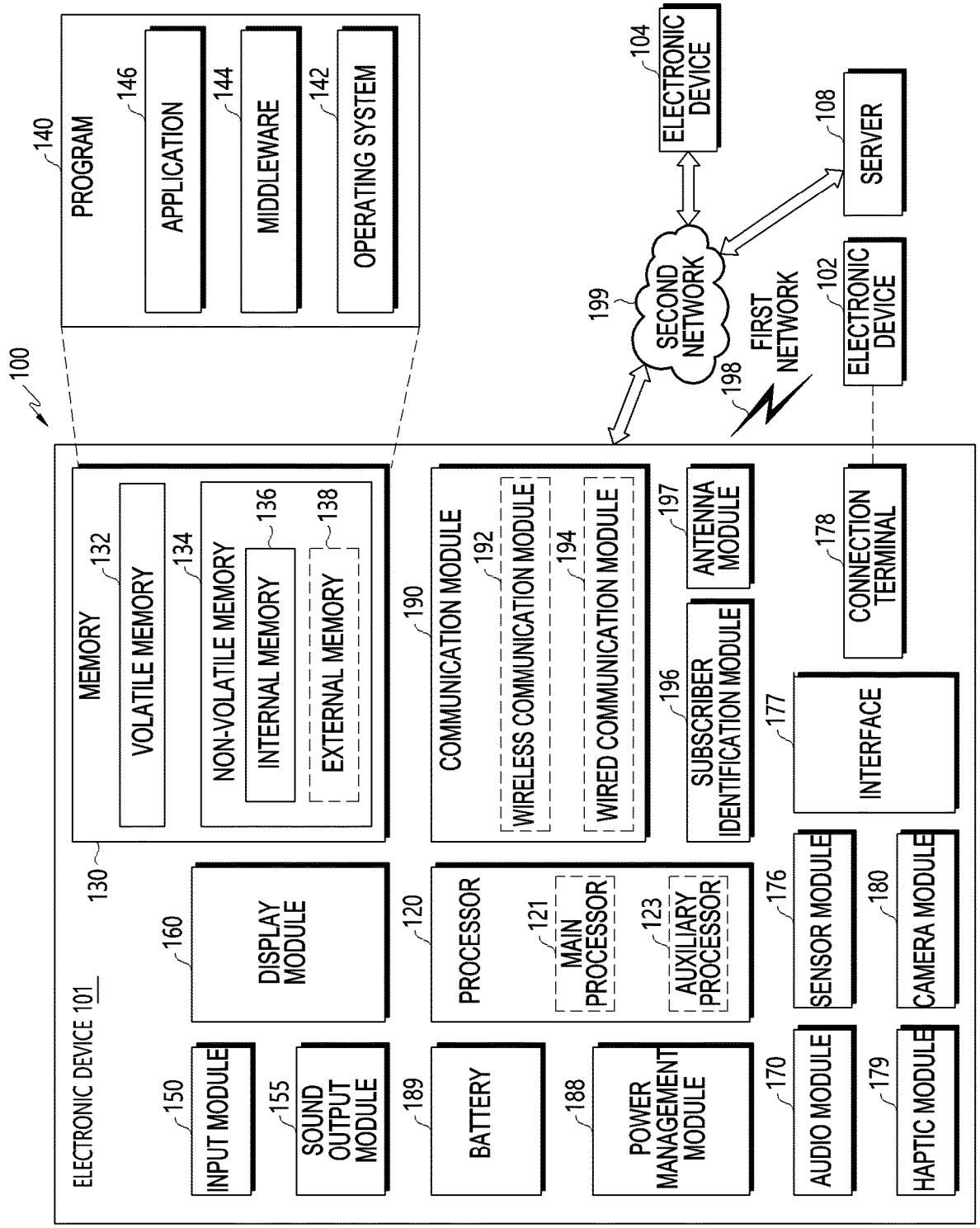
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
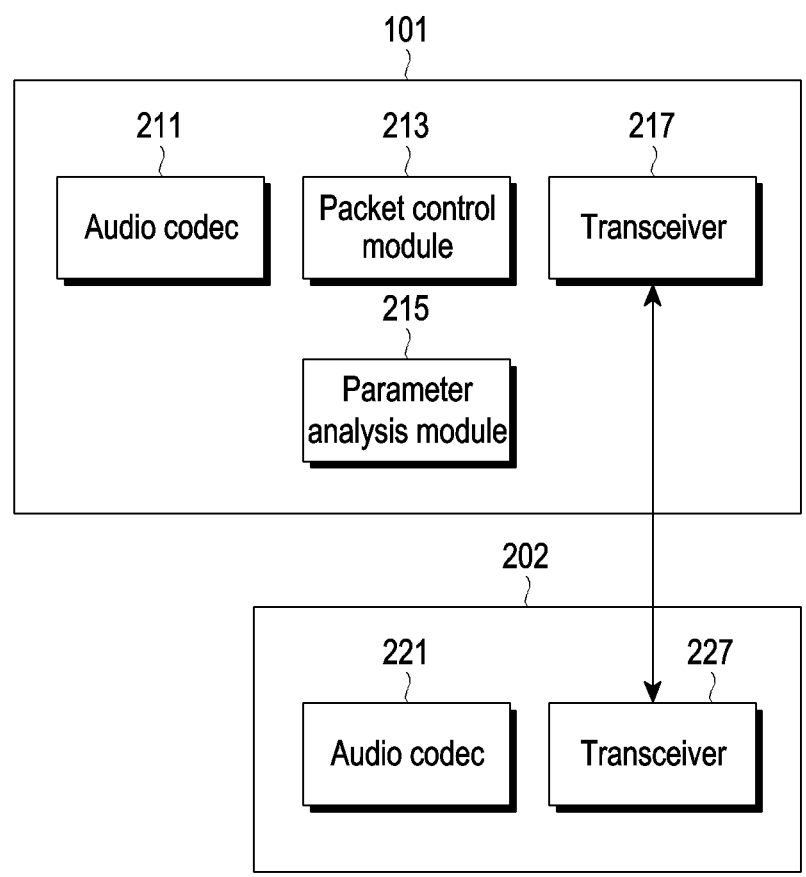
FIG. 2 is a block illustrating an example configuration of the electronic device and an external electronic device according to various embodiments.

FIG. 2 is a block diagram illustrating an example configuration of the electronic device and an external electronic device according to various embodiments.

Referring to FIG. 2, the electronic device 101 may communicate with an external electronic device 202. For example, the electronic device 101 may be implemented as a smartphone, and the external electronic device 202 may be implemented as a wireless earphone or a wireless speaker, but the electronic device 101 and the external electronic device 202 are not limited thereto.

Referring to FIG. 2, according to an embodiment, the electronic device 101 may include an audio codec 211, a packet control module (e.g., including various processing circuitry and/or executable program instructions) 213, a parameter analysis module (e.g., including various processing circuitry and/or executable program instructions) 215, and a transceiver 217. For example, the transceiver 217 may be included in the communication module 190 of FIG. 1. The transceiver 217 may be operated by the communication module 190 of FIG. 1. For example, the electronic device 101 may transmit data to or receive data from the external electronic device 202 via the transceiver 217 operated by the communication module 190.

According to an embodiment, each of the audio codec 211, the packet control module 213, or the parameter analysis module 215 may be executed by a controller (not shown) (or micro controller unit (MCU) included in the communication module 190 (e.g., Bluetooth module or Bluetooth low energy (BLE) module) or the processor 120 of the electronic device 101. Alternatively, each of the audio codec 211, the packet control module 213, or the parameter analysis module 215 may be included in the controller (not shown) (or MAC) included in the communication module 190 (e.g., Bluetooth module or BLE module) or the processor 120 of the electronic device 101.

According to an embodiment, the external electronic device 202 may be implemented similar to or in the same way as the electronic device 101 of FIG. 1. Referring to FIG. 2, the external electronic device 202 may include an audio codec 221 and a transceiver 227 according to an embodiment.

According to an embodiment, the audio codec 221 may be executed by a controller (not shown) (or MCU) included in a communication module (not shown) (e.g., Bluetooth module or BLE module) or a processor (not shown) of the external electronic device 202. Alternatively, the audio codec 221 may be included in the controller (not shown) (or MCU) included in the communication module (not shown) (e.g., Bluetooth module or BLE module) or the processor (not shown) of the external electronic device 202.

Figure 3A:
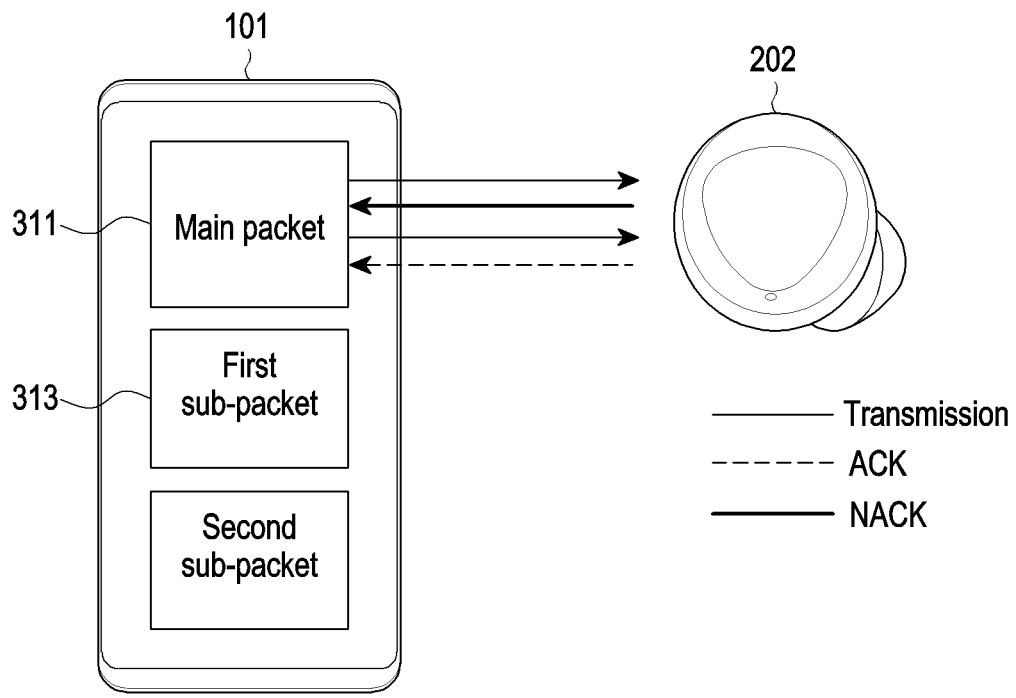
FIG. 3A is a diagram illustrating the electronic device and the external electronic device according to various embodiments.

FIG. 3A is a diagram illustrating the electronic device and the external electronic device according to various embodiments.

Referring to FIG. 3A, according to an embodiment, the electronic device 101 (e.g., at least one of the processor 120 or the communication module 190) may transmit data to or receive data from the external electronic device 202. To this end, the electronic device 101 may form a wireless communication connection (e.g., BLE connection) with the external electronic device 202 using a short-range communication scheme (e.g., Bluetooth communication scheme or BLE communication scheme). For example, the electronic device 101 may form a wireless communication connection with the external electronic device 202 using the communication module 190 and may transmit data to or receive data from the external electronic device 202 on the basis of the wireless communication connection.

According to an embodiment, the electronic device 101 may transmit a packet to or receive a packet from the external electronic device 202. For example, a packet may have a packet structure used for a Bluetooth communication scheme or a BLE communication scheme. A packet may include a header area, a payload area, and a tail area. A header area of a packet may include address information and control information of the packet. A payload area of a packet may include data of the packet. A tail area of a packet may include error detection information of the packet. For example, a packet may include compressed data in a payload area. For example, the electronic device 101 may transmit a packet to or receive a packet from the external electronic device 202, wherein the packet includes compressed data generated by encoding a frame included in an audio stream. For example, the electronic device 101 may transmit a packet to or receive a packet from the external electronic device 202, wherein the packet includes compressed data, which is generated by encoding a frame included in an audio stream, in a payload area that is a part of the packet. For example, a packet may include an identifier in a header area. For example, the electronic device 101 may transmit a packet to or receive a packet from the external electronic device 202, wherein the packet includes an identifier. For example, the electronic device 101 may transmit a packet to or receive a packet from the external electronic device 202, wherein the packet includes an identifier in a header area that is a part of the packet.

According to an embodiment, the electronic device 101 may generate compressed data obtained by compressing an audio stream. For example, the electronic device 101 may generate compressed data by encoding a frame included in an audio stream. For example, the electronic device 101 may generate, by encoding each frame included in an audio stream in units of frames, multiple pieces of compressed data corresponding to each frame. For example, the electronic device 101 may generate, by encoding a specific frame included in an audio stream, multiple pieces of compressed data corresponding to the specific frame. For example, the electronic device 101 may generate, by encoding a specific frame included in an audio stream, main compressed data corresponding to the specific frame and sub-compressed data corresponding to the specific data. According to an embodiment, main compressed data is compressed data corresponding to a specific frame. The external electronic device 202 may reconstruct a frame corresponding to a specific frame by decoding main compressed data. Reconstructing a frame corresponding to a specific frame may refer to generating a frame corresponding to the specific frame. According to an embodiment, sub-compressed data is compressed data corresponding to a specific frame. The external electronic device 202 may reconstruct a frame corresponding to a specific frame by performing decoding using both sub-compressed data and main compressed data. According to an embodiment, a first frame generated to correspond to a specific frame by performing decoding using both sub-compressed data and main compressed data may have a higher degree of similarity to the specific frame, in comparison with a second frame generated to correspond to the specific frame by performing decoding using only the main compressed data. For example, when at least one piece of main compressed data and multiple pieces of sub-compressed data, that is, first sub-compressed data, second sub-compressed data, . . . , and nth sub-compressed data, are generated corresponding to a specific frame by encoding the specific frame, as the number of sub-compressed data decoded together with the main compressed data increases, a degree of similarity between the specific frame and a frame reconstructed corresponding to the specific frame may increase. For example, as the number of decoded sub-compressed data increases, a sound quality of a reconstructed frame is improved.

According to an embodiment, the electronic device 101 may generate compressed data by encoding a frame included in an audio stream using a scalable residual coding scheme, but the encoding scheme is not limited thereto. Hereinafter, a packet including main compressed data may be referred to as a main packet, and a packet including sub-compressed data may be referred to as a sub-packet or an enhanced packet.

Referring to FIG. 3A, according to an embodiment, the electronic device 101 (e.g., at least one of the processor 120 or the communication module 190) may transmit a main packet 311 including main compressed data corresponding to a specific frame included in an audio stream to the external electronic device 202. If the main packet 311 transmitted by the electronic device 101 cannot be received, the external electronic device 202 may transmit a negative acknowledgment (NACK) signal to the electronic device 101 in response to a failure of receiving the packet from the electronic device 101 within a preconfigured time. If the electronic device 101 fails to receive a signal or receives an NACK signal from the external electronic device 202 within the predetermined time, the electronic device 101 may retransmit the main packet 311 including the previously transmitted main compressed data. The external electronic device 202 may transmit an acknowledgment (ACK) signal to the electronic device 101 in response to reception of the main packet 311 from the electronic device 101. According to an embodiment, the electronic device 101 may transmit a first sub-packet 313 in response to reception of the ACK signal from the external electronic device 202, which will be described with reference to FIG. 3B.

Figure 3B:
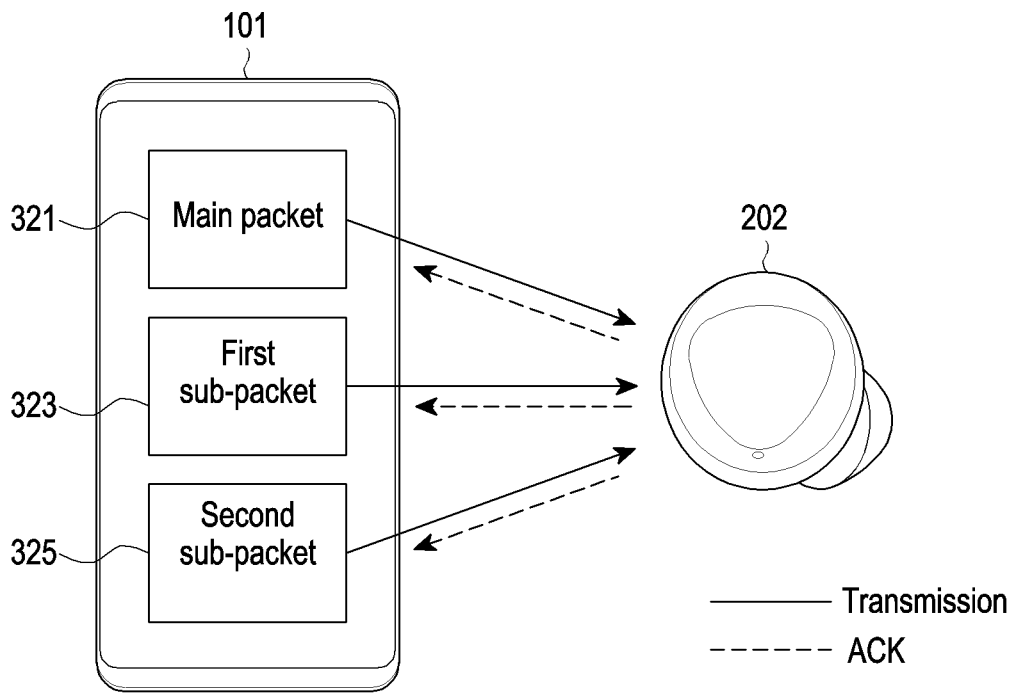
FIG. 3B is a diagram illustrating the electronic device and the external electronic device according to various embodiments.

FIG. 3B is a diagram illustrating the electronic device and the external electronic device according to various embodiments.

Referring to FIG. 3B, according to an embodiment, the electronic device 101 (e.g., at least one of the processor 120 or the communication module 190) may transmit a main packet 321 including main compressed data corresponding to a specific frame included in an audio stream to the external electronic device 202. The external electronic device 202 may transmit an ACK signal to the electronic device 101 in response to reception of the main packet 321 from the electronic device 101. When the ACK signal is received from the external electronic device 202 within a preconfigured time, the electronic device 101 may transmit a first sub-packet 323 including first sub-compressed data corresponding to the specific frame included in the audio stream to the external electronic device 202. The external electronic device 202 may transmit the ACK signal to the electronic device 101 in response to receiving the first sub-packet 323 from the electronic device 101. When the ACK signal is received from the external electronic device 202 within the preconfigured time, the electronic device 101 may transmit a second sub-packet 325 including second sub-compressed data corresponding to the specific frame included in the audio stream to the external electronic device 202. The external electronic device 202 may transmit the ACK signal to the electronic device 101 in response to reception of the second sub-packet 325 from the electronic device 101. In this case, the external electronic device 202 may reconstruct a frame corresponding to the specific frame by performing decoding using all of the main compressed data included in the received main packet 321, the first sub-compressed data included in the received first sub-packet 323, and the second sub-compressed data included in the received second sub-packet 325.

Figure 4A:
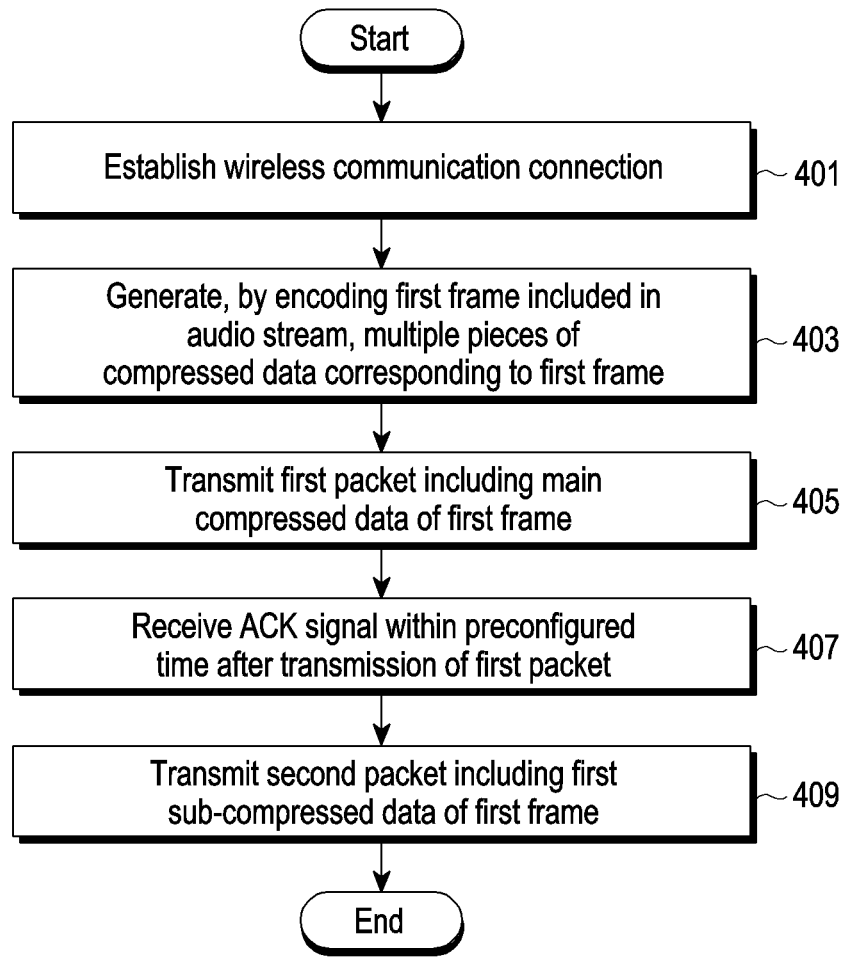
FIG. 4A is a flowchart illustrating an example method of operating the electronic device according to various embodiments.

FIG. 4A is a flowchart illustrating an example method of operating the electronic device according to various embodiments;

Referring to FIG. 4A, in operation 401, according to an embodiment, the electronic device 101 (e.g., at least one of the processor 120 or the communication module 190) may establish a wireless communication connection between the electronic device 101 and the external electronic device 202.

In operation 403, according to an embodiment, the electronic device 101 may generate, by encoding a first frame included in an audio stream, multiple pieces of compressed data corresponding to the first frame. For example, the multiple pieces of compressed data generated corresponding to the first frame may include at least one piece of main compressed data corresponding to the first frame and at least one piece of sub-compressed data corresponding to the first frame.

In operation 405, according to an embodiment, the electronic device 101 may transmit a first packet including the main compressed data corresponding to the first frame from among the multiple pieces of compressed data to the external electronic device 202 via the transceiver 217 on the basis of the wireless communication connection.

In operation 407, according to an embodiment, after transmitting the first packet, the electronic device 101 may receive an ACK signal from the external electronic device 202 via the transceiver 217 on the basis of the wireless communication connection. For example, the electronic device 101 may receive, within a preconfigured (e.g., specified) time after transmitting the first packet, an ACK signal from the external electronic device 202 via the transceiver 217 on the basis of the wireless communication connection.

In operation 409, according to an embodiment, when the ACK signal is received within the preconfigured time after transmission of the first packet from the external electronic device 202 via the transceiver 217 on the basis of the wireless communication connection, the electronic device 101 may transmit a second packet, which includes first sub-compressed data corresponding to the first frame from among the multiple pieces of compressed data, to the external electronic device 202 via the transceiver 217 on the basis of the wireless communication connection.

Figure 4B:
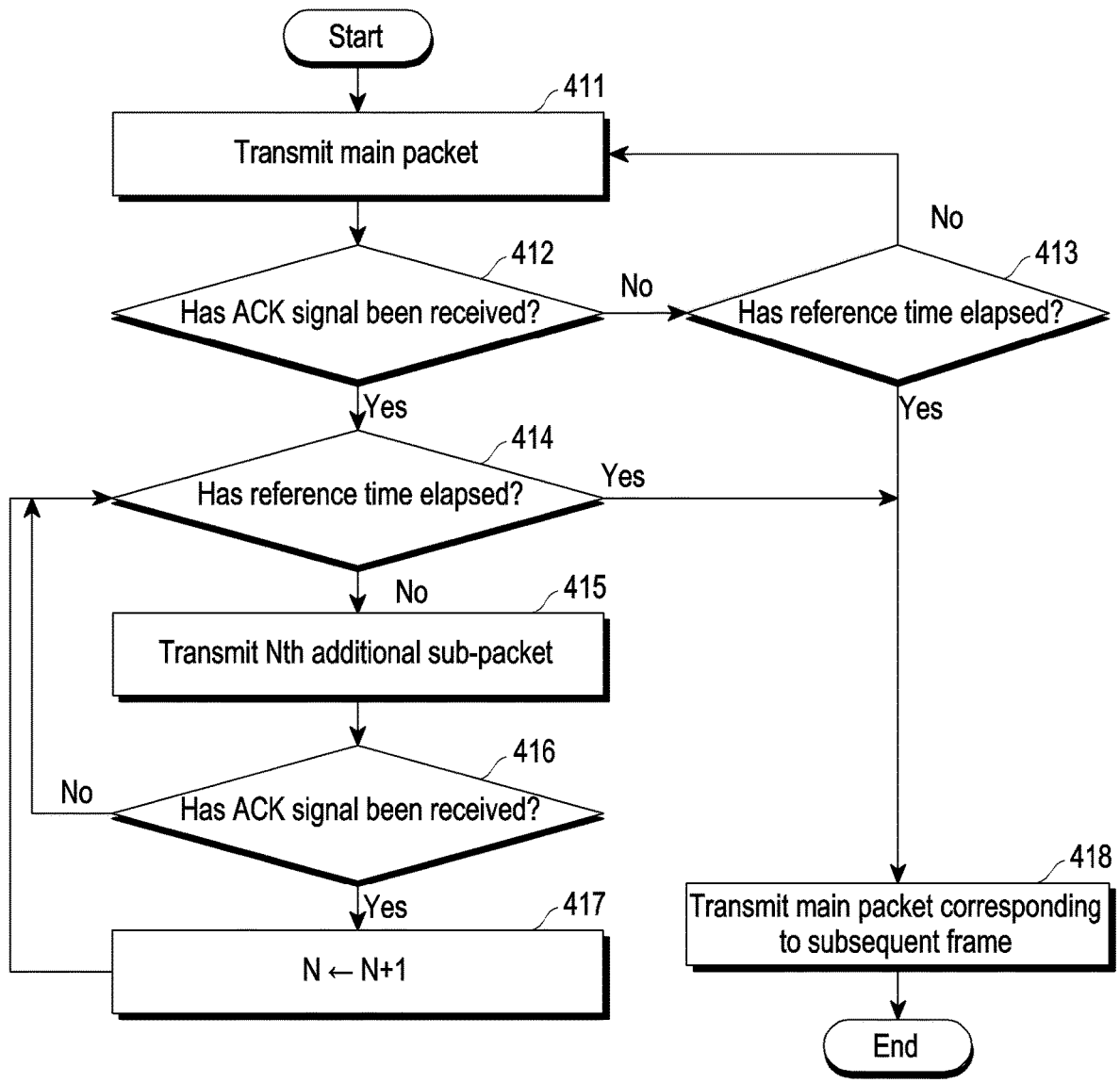
FIG. 4B is a flowchart illustrating an example method of operating the electronic device according to various embodiments.

FIG. 4B is a flowchart illustrating an example method of operating the electronic device according to various embodiments.

Referring to FIG. 4B, in operation 411, according to an embodiment, the electronic device 101 (e.g., at least one of the processor 120 or the communication module 190) may transmit a main packet, which includes main compressed data corresponding to a first frame included in an audio stream from among multiple pieces of compressed data generated by encoding the first frame and corresponding to the first frame, to the external electronic device 202 via the transceiver 217 on the basis of a wireless communication connection.

In operation 412, according to an embodiment, the electronic device 101 may determine whether an ACK signal has been received from the external electronic device 202. For example, the electronic device 101 may determine whether the ACK signal has been received from the external electronic device 202 within a preconfigured time. In this case, if the ACK signal is received, the electronic device 101 may perform operation 414, and if the ACK signal cannot be or is not received, the electronic device 101 may perform operation 413.

In operation 413, according to an embodiment, the electronic device 101 may determine whether a reference time has elapsed.

In an embodiment, the reference time may be a preconfigured (e.g., specified) time for transmission or reception of a packet, which includes compressed data corresponding to a specific frame included in the audio stream, between the electronic device 101 and the external electronic device 202. For example, if a first reference time elapses, a packet including compressed data corresponding to a specific frame determined to be transmitted in the first reference time is no longer transmitted, and during a subsequent second reference time, a packet including compressed data corresponding to a subsequent specific frame determined to be transmitted in the second reference time may be transmitted.

For example, the electronic device 101 may transmit, during the first reference time, the packet including compressed data corresponding to the specific frame included in the audio stream to the external electronic device 202. If the first reference time has not elapsed, the electronic device 101 may additionally transmit the packet including compressed data corresponding to the specific frame to the external electronic device 202. Accordingly, if it is determined that the main packet corresponding to the specific frame has not been transmitted within the first reference time, the electronic device 101 may retransmit the main packet corresponding to the specific frame, and if it is determined that the main packet corresponding to the specific frame has been transmitted, a sub-packet corresponding to the specific frame may be additionally transmitted. If the first reference time has elapsed, the electronic device 101 may transmit the packet including compressed data corresponding to the subsequent specific frame adjacent to the specific frame to the external electronic device 202 during the subsequent second reference time.

Accordingly, in operation 413, according to an embodiment, the electronic device 101 may determine whether the first reference time, in which the packet including compressed data corresponding to the first frame is determined to be transmitted, has elapsed. If it is determined that the first reference time has not elapsed, the electronic device 101 may perform operation 411 so as to retransmit the main packet including the main compressed data corresponding to the first frame to the external electronic device 202 via the transceiver 217 on the basis of the wireless communication connection. If it is determined that the first reference time has elapsed, the electronic device 101 may perform operation 418.

In operation 414, according to an embodiment, the electronic device 101 may determine whether the reference time has elapsed. For example, the electronic device 101 may determine whether the first reference time, in which the packet including compressed data corresponding to the first frame is determined to be transmitted, has elapsed. If it is determined that the first reference time has elapsed, the electronic device 101 may perform operation 418. If it is determined that the first reference time has not elapsed, the electronic device 101 may perform operation 415.

In operation 415, according to an embodiment, the electronic device 101 may transmit a sub-packet, which includes sub-compressed data corresponding to the first frame included in the audio stream from among the multiple pieces of compressed data generated by encoding the first frame and corresponding to the first frame, to the external electronic device 202 via the transceiver 217 on the basis of the wireless communication connection. For example, the electronic device 101 may transmit an Nth sub-packet including Nth sub-compressed data corresponding to the first frame to the external electronic device 202. For example, if a packet transmitted immediately before is the main packet including the main compressed data corresponding to the first frame, the electronic device 101 may transmit a first sub-packet including first sub-compressed data to the external electronic device 202. For example, if the packet transmitted immediately before is the first sub-packet including the first sub-compressed data corresponding to the first frame, the electronic device 101 may transmit a second sub-packet including second sub-compressed data to the external electronic device 202.

In operation 416, according to an embodiment, the electronic device 101 may determine whether an ACK signal has been received from the external electronic device 202. For example, the electronic device 101 may determine whether the ACK signal has been received from the external electronic device 202 within the preconfigured time. In this case, if the ACK signal is received, the electronic device 101 may perform operation 417, and if the ACK signal cannot be received, the electronic device 101 may perform operation 414.

In operation 417, according to an embodiment, the electronic device 101 may increase an indication parameter by 1 in order to additionally transmit the Nth sub-packet in operation 415. For example, the N-th sub-packet transmitted in operation 415 may be determined according to the indication parameter determined in operation 417. However, operation 417 is only an embodiment for determining a sub-packet transmitted in operation 415, and a method of determining the Nth sub-packet transmitted in operation 415 by the electronic device 101 is not limited thereto.

In operation 418, according to an embodiment, the electronic device 101 may transmit a main packet to the external electronic device 202 via the transceiver 217 on the basis of the wireless communication connection, wherein the main packet includes main compressed data corresponding to a second frame adjacent to the first frame included in the audio stream from among multiple pieces of compressed data generated by encoding the second frame and corresponding to the second frame. For example, after transmitting the main packet including the main compressed data corresponding to the second frame in operation 418, the electronic device 101 may perform an operation similar to operation 412.

FIGS. 5A, 5B, 6A, 6B, 7A, 7B, 8A and 8B (which may also be referred to herein as FIG. 5 to FIG. 8) are diagrams of comparing and illustrating transmitting only a main packet including main compressed data corresponding to a specific frame and transmitting a sub-packet including sub-compressed data corresponding to the specific frame according to various embodiments.

P0, P1, . . . , Pn refer to a packet including compressed data corresponding to a first frame, a second frame, . . . , and an (n+1)th frame, respectively. In the embodiment of transmitting only a main packet including main compressed data, each packet is indicated as P0, P1, . . . , Pn, and in the embodiment of transmitting a main packet including main compressed data and a sub-packet including sub-compressed data, each packet is divided into the main packet and the sub-packet (or enhanced packet) so that each packet is indicated as Main P0, Enhanced P0, Main P1, Enhanced P1, . . . , Main Pn, Enhanced Pn. When there exist multiple pieces of sub-compressed data corresponding to a specific frame, for example, a first sub-packet including first sub-compressed data corresponding to a first frame is indicated as Enhanced P0 #1, and a second sub-packet including second sub-compressed data corresponding to the first frame is indicated as Enhanced P0 #2. Accordingly, P0 or Main P0 refers to the main compressed data corresponding to the first frame, Enhanced P0 #1 refers to the first sub-packet including first sub-compressed data corresponding to the first frame, and Enhanced P0 #2 refers to the second sub-packet including second sub-compressed data corresponding to the first frame.

ACK indicates that an acknowledgment signal has been received or transmitted, NACK indicates that a negative acknowledgment signal has been received or transmitted, and Missing ACK indicates that neither an ACK signal nor an NACK signal has been received or transmitted.

A flush point refers to an end point at which a packet including compressed data corresponding to each frame is no longer transmitted. For example, a packet including compressed data corresponding to the first frame may be transmitted before flush point P0, but a packet including compressed data corresponding to the first frame is not transmitted after flush point P0.

A burst number (BN), a flush timeout (FT), and the number of sub-events (NSE) included in initial parameters are defined as follows.

NSE refers to the maximum number of sub-events included in each interval (e.g., channel interval or ISO Interval). For example, if NSE is 4, up to four times of packet transmission and transmission of an ACK signal (or NACK signal) in response to the packet transmission may be performed in one Interval (e.g., ISO Interval (2) of FIG. 5B).

BN refers to the maximum number of packets transmitted in each interval. Here, the maximum number of transmitted packets is determined based on the number of packets corresponding to a new frame, for example, if BN is 1, packets corresponding to one new frame, for example, packets corresponding to the first frame, may be transmitted in one interval. In this case, both the main packet including main compressed data corresponding to the first frame and the sub-packet including sub-compressed data corresponding to the first frame may be transmitted in one interval. That is, from the viewpoint of the BN, the main packet and the sub-packet are not counted as overlapping. For example, if BN is 2, packets corresponding to two new frames, for example, packets corresponding to the first frame and packets corresponding to a second frame may be transmitted, in each interval.

FT refers to the maximum number of intervals during which retransmission of a packet corresponding to a new frame is possible. For example, if FT is 1, a packet corresponding to a new frame may be transmitted within at most one interval. If FT is 2, a packet corresponding to a new frame may be transmitted within the maximum of two intervals.

According to an embodiment, initial parameters including a burst number (BN), a flush timeout (FT), and the number of sub-events (NSE) may be determined based on a wireless communication connection established between an electronic device (e.g., the electronic device 101 of FIG. 2) and an external electronic device (e.g., the external electronic device 202 of FIG. 2). For example, based on the wireless communication connection established between the electronic device 101 and the external electronic device 202, the electronic device 101 and the external electronic device 202 may check information on the initial parameters including BN, FT, and NSE. For example, the electronic device 101 may transmit information on the initial parameters including BN, FT, and NSE to the external electronic device 202 via the wireless communication connection.

Hereinafter, each embodiment corresponding to the numerical values of NSE, BN, and FT will be described.

FIGS. 5A and 5B are diagrams illustrating an example method for transmitting data to or receiving data from the external electronic device by the electronic device according to various embodiments.

FIG. 5A is a diagram illustrating a comparative example for comparison between various embodiments of transmitting only a main packet including main compressed data corresponding to a specific frame, and FIG. 5B is a diagram illustrating an embodiment of transmitting not only a main packet including main compressed data corresponding to a specific frame but also a sub-packet including sub-compressed data corresponding to the specific frame.

Referring to FIGS. 5A and 5B, according to an embodiment, the electronic device 101 may be a master (M), and an external electronic device 202 may be a slave (S).

FIGS. 5A and 5B illustrate an embodiment in which NSE is configured to 4, BN is configured to 1, and FT is configured to 1. Referring to FIGS. 5A and 5B, NSE is configured to 4, and 4 sub-events may thus exist in one interval. BN is configured to 1, and packets corresponding to one new frame may be thus transmitted in one interval. FT is configured to 1, and packets corresponding to a new frame may be thus transmitted within up to one interval.

Referring to ISO Interval (1) of FIG. 5A, according to a comparative example, the electronic device 101 (e.g., at least one of the processor 120 or the communication module 190) may transmit P0 (e.g., main packet including main compressed data corresponding to a first frame) to the external electronic device 202. The external electronic device 202 may transmit an ACK signal to the electronic device 101 in response to receiving P0 from the electronic device 101. The electronic device 101 may receive the ACK signal from the external electronic device 202 within a preconfigured time. If the electronic device 101 receives the ACK signal from the external electronic device 202 within the preconfigured time after transmission of P0, it may be determined that P0 has been transmitted to the external electronic device 202. The electronic device 101 may no longer transmit a packet in ISO Interval (1), based on determination that P0 has been transmitted to the external electronic device 202.

Referring to ISO Interval (2) of FIG. 5A, according to the comparative example, the electronic device 101 may transmit P1 (e.g., main packet including main compressed data corresponding to a second frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of P1, it may be determined that P1 is not transmitted to the external electronic device 202. In this case, the electronic device 101 may retransmit P1 to the external electronic device 202. The external electronic device 202 may transmit an ACK signal to the electronic device 101 in response to receiving P1 from the electronic device 101. The electronic device 101 may receive the ACK signal from the external electronic device 202 within the preconfigured time. If the electronic device 101 receives the ACK signal from the external electronic device 202 within the preconfigured time after transmission of P1, it may be determined that P1 has been transmitted to the external electronic device 202. The electronic device 101 may no longer transmit a packet in ISO Interval (2), based on determination that P1 has been transmitted to the external electronic device 202.

Referring to ISO Interval (3) of FIG. 5A, according to the comparative example, the electronic device 101 may transmit P2 (e.g., main packet including main compressed data corresponding to a third frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of P2, it may be determined that P2 is not transmitted to the external electronic device 202. In this case, the electronic device 101 may retransmit P2 to the external electronic device 202. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of P2, it may be determined that P2 is not transmitted to the external electronic device 202. In this case, the electronic device 101 may retransmit P2 to the external electronic device 202 again. The external electronic device 202 may transmit an ACK signal to the electronic device 101 in response to receiving P2 from the electronic device 101. The electronic device 101 may receive the ACK signal from the external electronic device 202 within the preconfigured time. If the electronic device 101 receives the ACK signal from the external electronic device 202 within the preconfigured time after P2 is retransmitted again, it may be determined that P2 has been transmitted to the external electronic device 202. The electronic device 101 may no longer transmit a packet in ISO Interval (3), based on determination that P2 has been transmitted to the external electronic device 202.

Referring to ISO Interval (4) of FIG. 5A, according to the comparative example, the electronic device 101 may transmit P3 (e.g., main packet including main compressed data corresponding to a fourth frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of P3, it may be determined that P3 is not transmitted to the external electronic device 202. In this case, the electronic device 101 may retransmit P3 to the external electronic device 202. The external electronic device 202 may transmit an ACK signal to the electronic device 101 in response to receiving P3 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after retransmission of P3, it may be determined that P3 is not transmitted to the external electronic device 202. In this case, the electronic device 101 may retransmit P3 back to the external electronic device 202. The external electronic device 202 may transmit an ACK signal to the electronic device 101 in response to receiving P3 from the electronic device 101. The external electronic device 202 may transmit an NACK signal to the electronic device 101 in response to a failure of receiving the packet from the electronic device 101 within the preconfigured time. Even if the external electronic device 202 has transmitted an ACK signal or a NACK signal to the electronic device 101, the electronic device 101 may fail to receive the signal from the external electronic device 202 within the preconfigured time. If the electronic device 101 has failed to receive a signal from the external electronic device 202 within the preconfigured time after retransmission of P3, it may be determined that P3 is not transmitted to the external electronic device 202. In this case, the electronic device 101 may retransmit P3 to the external electronic device 202 again. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after P3 is retransmitted again, it may be determined that P3 is not transmitted to the external electronic device 202. The electronic device 101 may no longer transmit a packet in ISO Interval (4), based on determination that flush point P3 has been reached in ISO Interval (4).

Referring to ISO Interval (1) of FIG. 5B, according to an embodiment, the electronic device 101 (e.g., at least one of the processor 120 or the communication module 190) may transmit Main P0 (e.g., main packet including main compressed data corresponding to a first frame) to the external electronic device 202. The external electronic device 202 may transmit an ACK signal to the electronic device 101 in response to receiving Main P0 from the electronic device 101. The electronic device 101 may receive the ACK signal from the external electronic device 202 within a preconfigured time. If the electronic device 101 receives the ACK signal from the external electronic device 202 within the preconfigured time after transmission of Main P0, it may be determined that Main P0 has been transmitted to the external electronic device 202. The electronic device 101 may transmit Enhanced P0 #1 (e.g., first sub-packet including first sub-compressed data corresponding to the first frame), based on determination that Main P0 has been transmitted to the external electronic device 202. The external electronic device 202 may transmit an ACK signal to the electronic device 101 in response to receiving Enhanced P0 #1 from the electronic device 101. If the electronic device 101 receives the ACK signal from the external electronic device 202 within a preconfigured time after transmission of Enhanced P0 #1, it may be determined that Enhanced P0 #1 has been transmitted to the external electronic device 202. The electronic device 101 may transmit Enhanced P0 #2 (e.g., second sub-packet including second sub-compressed data corresponding to the first frame), based on determination that Enhanced P0 #1 has been transmitted to the external electronic device 202. The external electronic device 202 may transmit an ACK signal to the electronic device 101 in response to receiving Enhanced P0 #2 from the electronic device 101. If the electronic device 101 receives the ACK signal from the external electronic device 202 within the preconfigured time after transmission of Enhanced P0 #2, it may be determined that Enhanced P0 #2 has been transmitted to the external electronic device 202. The electronic device 101 may transmit Enhanced P0 #3 (e.g., third sub-packet including third sub-compressed data corresponding to the first frame), based on determination that Enhanced P0 #2 has been transmitted to the external electronic device 202. The external electronic device 202 may transmit an ACK signal to the electronic device 101 in response to receiving Enhanced P0 #3 from the electronic device 101. If the electronic device 101 receives the ACK signal from the external electronic device 202 within a preconfigured time after transmission of Enhanced P0 #3, it may be determined that Enhanced P0 #3 has been transmitted to the external electronic device 202. The electronic device 101 may no longer transmit a packet in ISO Interval (1), based on determination that Enhanced P0 #3 has been transmitted to the external electronic device 202. Alternatively, the electronic device 101 may no longer transmit a packet in ISO Interval (1), based on determination that flush point P0 has been reached in ISO Interval (1).

Referring to ISO Interval (2) of FIG. 5B, according to an embodiment, the electronic device 101 may transmit Main P1 (e.g., main packet including main compressed data corresponding to a second frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of Main P1, it may be determined that Main P1 is not transmitted to the external electronic device 202. In this case, the electronic device 101 may retransmit Main P1 to the external electronic device 202. The external electronic device 202 may transmit an ACK signal to the electronic device 101 in response to receiving Main P1 from the electronic device 101. The electronic device 101 may receive the ACK signal from the external electronic device 202 within the preconfigured time. If the electronic device 101 receives the ACK signal from the external electronic device 202 within the preconfigured time after transmission of Main P1, it may be determined that Main P1 has been transmitted to the external electronic device 202. The electronic device 101 may transmit Enhanced P1 #1 (e.g., first sub-packet including first sub-compressed data corresponding to the second frame), based on determination that Main P1 has been transmitted to the external electronic device 202. The external electronic device 202 may transmit an ACK signal to the electronic device 101 in response to receiving Enhanced P1 #1 from the electronic device 101. If the electronic device 101 receives the ACK signal from the external electronic device 202 within a preconfigured time after transmission of Enhanced P1 #1, it may be determined that Enhanced P1 #1 has been transmitted to the external electronic device 202. The electronic device 101 may transmit Enhanced P1 #2 (e.g., second sub-packet including second sub-compressed data corresponding to the second frame), based on determination that Enhanced P1 #1 has been transmitted to the external electronic device 202. The external electronic device 202 may transmit an ACK signal to the electronic device 101 in response to receiving Enhanced P1 #2 from the electronic device 101. If the electronic device 101 receives the ACK signal from the external electronic device 202 within a preconfigured time after transmission of Enhanced P1 #2, it may be determined that Enhanced P1 #2 has been transmitted to the external electronic device 202. The electronic device 101 may transmit Enhanced P1 #3 (e.g., third sub-packet including third sub-compressed data corresponding to the second frame), based on determination that Enhanced P1 #2 has been transmitted to the external electronic device 202. The external electronic device 202 may transmit an ACK signal to the electronic device 101 in response to receiving Enhanced P1 #3 from the electronic device 101. If the electronic device 101 receives the ACK signal from the external electronic device 202 within a preconfigured time after transmission of Enhanced P1 #3, it may be determined that Enhanced P1 #3 has been transmitted to the external electronic device 202. The electronic device 101 may no longer transmit a packet in ISO Interval (2), based on determination that Enhanced P1 #3 has been transmitted to the external electronic device 202. Alternatively, the electronic device 101 may no longer transmit a packet in ISO Interval (2), based on determination that flush point P1 has been reached in ISO Interval (2).

Referring to ISO Interval (3) of FIG. 5B, according to an embodiment, the electronic device 101 may transmit Main P2 (e.g., main packet including main compressed data corresponding to a third frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of Main P2, it may be determined that Main P2 is not transmitted to the external electronic device 202. In this case, the electronic device 101 may retransmit Main P2 to the external electronic device 202. The external electronic device 202 may transmit the NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of Main P2, it may be determined that Main P2 is not transmitted to the external electronic device 202. In this case, the electronic device 101 may retransmit Main P2 to the external electronic device 202 again. The external electronic device 202 may transmit an ACK signal to the electronic device 101 in response to receiving Main P2 from the electronic device 101. The electronic device 101 may receive the ACK signal from the external electronic device 202 within the preconfigured time. If the electronic device 101 receives the ACK signal from the external electronic device 202 within the preconfigured time after Main P2 is retransmitted again, it may be determined that Main P2 has been transmitted to the external electronic device 202. The electronic device 101 may transmit Enhanced P2 #1 (e.g., first sub-packet including the first sub-compressed data corresponding to the third frame), based on determination that Main P2 has been transmitted to the external electronic device 202. The external electronic device 202 may transmit an ACK signal to the electronic device 101 in response to receiving Enhanced P2 #1 from the electronic device 101. Even if the external electronic device 202 has transmitted the ACK signal to the electronic device 101, the electronic device 101 may fail to receive the signal from the external electronic device 202 within a preconfigured time. If the electronic device 101 has failed to receive a signal from the external electronic device 202 within the preconfigured time after transmission of Enhanced P2 #1, it may be determined that Enhanced P2 #1 is not transmitted to the external electronic device 202. The electronic device 101 may no longer transmit a packet in ISO Interval (3), based on determination that flush point P2 has been reached in ISO Interval (3).

Referring to ISO Interval (4) of FIG. 5B, according to an embodiment, the electronic device 101 may transmit Main P3 (e.g., main packet including main compressed data corresponding to a fourth frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of Main P3, it may be determined that Main P3 is not transmitted to the external electronic device 202. In this case, the electronic device 101 may retransmit Main P3 to the external electronic device 202. The external electronic device 202 may transmit an ACK signal to the electronic device 101 in response to receiving Main P3 from the electronic device 101. Even if the external electronic device 202 has transmitted the ACK signal to the electronic device 101, the electronic device 101 may fail to receive the signal from the external electronic device 202 within a preconfigured time. If the electronic device 101 has failed to receive a signal from the external electronic device 202 within the preconfigured time after retransmission of Main P3, it may be determined that Main P3 is not transmitted to the external electronic device 202. In this case, the electronic device 101 may retransmit Main P3 to the external electronic device 202 again. The external electronic device 202 may transmit an ACK signal to the electronic device 101 in response to receiving Main P3 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after retransmission of Main P3, it may be determined that Main P3 is not transmitted to the external electronic device 202. In this case, the electronic device 101 may retransmit Main P3 to the external electronic device 202 again. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after Main P3 is retransmitted again, it may be determined that Main P3 is not transmitted to the external electronic device 202. The electronic device 101 may no longer transmit a packet in ISO Interval (4), based on determination that flush point P3 has been reached in ISO Interval (4).

Figure 6A:
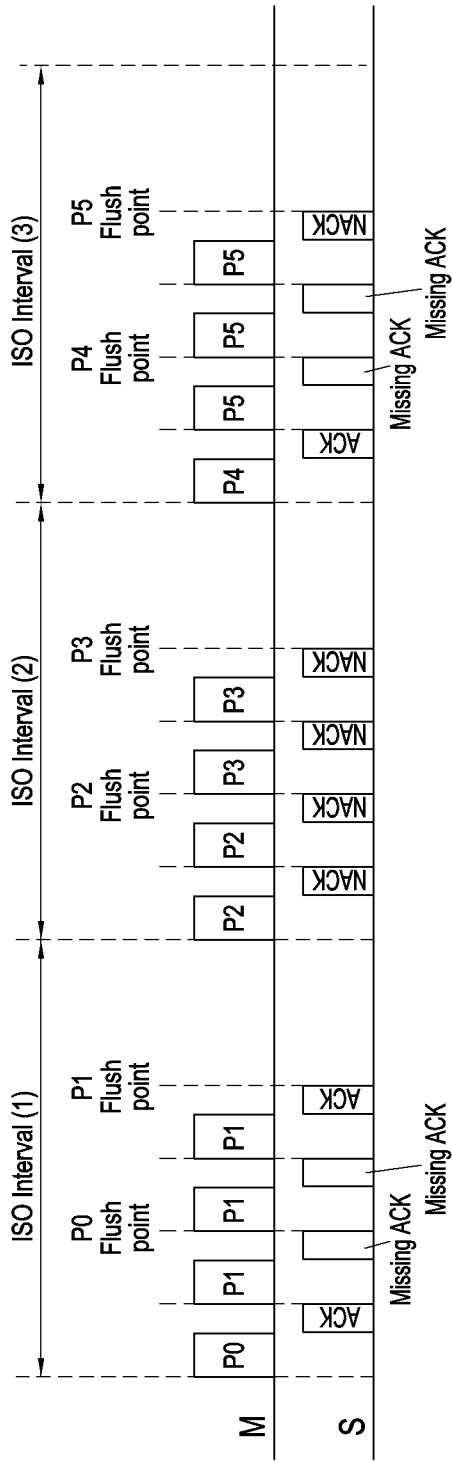
FIGS. 6A and 6B are diagrams illustrating an example method for transmitting data to or receiving data from the external electronic device by the electronic device according to various embodiments.
Figure 6B:
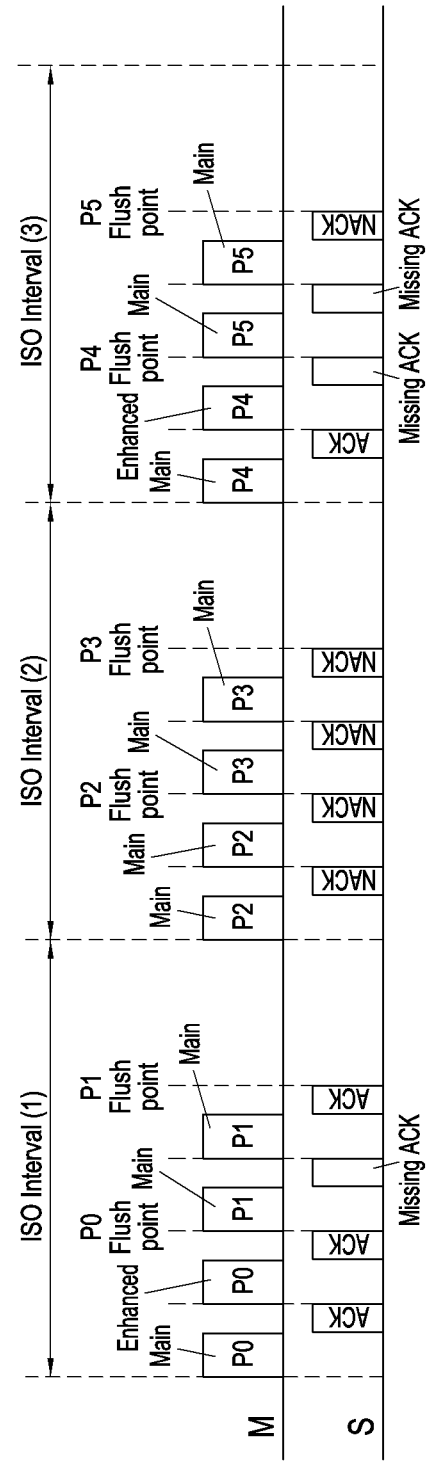

FIGS. 6A and 6B are diagrams illustrating an example method for transmitting data to or receiving data from the external electronic device by the electronic device according to various embodiments.

FIG. 6A is a diagram illustrating a comparative example for comparison between various embodiments of transmitting only a main packet including main compressed data corresponding to a specific frame, and FIG. 6B is a diagram illustrating an embodiment of transmitting not only a main packet including main compressed data corresponding to a specific frame but also a sub-packet including sub-compressed data corresponding to the specific frame.

Referring to FIGS. 6A and 6B, according to an embodiment, the electronic device 101 may be a master (M), and an external electronic device 202 may be a slave (S).

FIGS. 6A and 6B illustrate an embodiment in which NSE is configured to 4, BN is configured to 2, and FT is configured to 1. Referring to FIGS. 6A and 6B, NSE is configured to 4, and 4 sub-events may thus exist in one interval. BN is configured to 2, and packets corresponding to two new frames may be transmitted in one interval. FT is configured to 1, and packets corresponding to a new frame may be thus transmitted within the maximum of one interval.

Referring to ISO Interval (1) of FIG. 6A, according to a comparative example, the electronic device 101 (e.g., at least one of the processor 120 or the communication module 190) may transmit P0 (e.g., main packet including main compressed data corresponding to a first frame) to the external electronic device 202. The external electronic device 202 may transmit an ACK signal to the electronic device 101 in response to receiving P0 from the electronic device 101. The electronic device 101 may receive the ACK signal from the external electronic device 202 within a preconfigured time. If the electronic device 101 receives the ACK signal from the external electronic device 202 within the preconfigured time after transmission of P0, it may be determined that P0 has been transmitted to the external electronic device 202. The electronic device 101 may transmit P1 (e.g., main packet including main compressed data corresponding to a second frame) to the external electronic device 202, based on determination that P0 has been transmitted to the external electronic device 202. The external electronic device 202 may transmit an ACK signal to the electronic device 101 in response to receiving P1 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after transmission of P1, it may be determined that P1 is not transmitted to the external electronic device 202. In this case, the electronic device 101 may retransmit P1 to the external electronic device 202. The external electronic device 202 may transmit an ACK signal to the electronic device 101 in response to receiving P1 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after retransmission of P1, it may be determined that P1 is not transmitted to the external electronic device 202. In this case, the electronic device 101 may retransmit P1 to the external electronic device 202 again. The external electronic device 202 may transmit an ACK signal to the electronic device 101 in response to receiving P1 from the electronic device 101. The electronic device 101 may receive the ACK signal from the external electronic device 202 within the preconfigured time. If the electronic device 101 receives the ACK signal from the external electronic device 202 within the preconfigured time after P1 is retransmitted again, it may be determined that P1 has been transmitted to the external electronic device 202. The electronic device 101 may no longer transmit a packet in ISO Interval (1), based on determination that P1 has been transmitted to the external electronic device 202. Alternatively, the electronic device 101 may no longer transmit a packet in ISO Interval (1), based on determination that flush point P1 has been reached in ISO Interval (1).

Referring to ISO Interval (2) of FIG. 6A, according to the comparative example, the electronic device 101 may transmit P2 (e.g., main packet including main compressed data corresponding to a third frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of P2, it may be determined that P2 is not transmitted to the external electronic device 202. In this case, the electronic device 101 may retransmit P2 to the external electronic device 202. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of P2, it may be determined that P2 is not transmitted to the external electronic device 202. The electronic device 101 may transmit P3 (e.g., main packet including main compressed data corresponding to a fourth frame) to the external electronic device 202, based on determination that flush point P2 has been reached in ISO Interval (2). The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of P3, it may be determined that P3 is not transmitted to the external electronic device 202. In this case, the electronic device 101 may retransmit P3 to the external electronic device 202. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of P3, it may be determined that P3 is not transmitted to the external electronic device 202. The electronic device 101 may no longer transmit a packet in ISO Interval (2), based on determination that flush point P3 has been reached in ISO Interval (2).

Referring to ISO Interval (3) of FIG. 6A, according to the comparative example, the electronic device 101 may transmit P4 (e.g., main packet including main compressed data corresponding to a fifth frame) to the external electronic device 202. The external electronic device 202 may transmit an ACK signal to the electronic device 101 in response to receiving P4 from the electronic device 101. The electronic device 101 may receive the ACK signal from the external electronic device 202 within a preconfigured time. If the electronic device 101 receives the ACK signal from the external electronic device 202 within the preconfigured time after transmission of P4, it may be determined that P4 has been transmitted to the external electronic device 202. The electronic device 101 may transmit P5 (e.g., main packet including main compressed data corresponding to a sixth frame) to the external electronic device 202, based on determination that P4 has been transmitted to the external electronic device 202. The external electronic device 202 may transmit an ACK signal to the electronic device 101 in response to receiving P5 from the electronic device 101. Even if the external electronic device 202 has transmitted the ACK signal to the electronic device 101, the electronic device 101 may fail to receive the signal from the external electronic device 202 within a preconfigured time. If the electronic device 101 has failed to receive a signal from the external electronic device 202 within the preconfigured time after transmission of P5, it may be determined that P5 is not transmitted to the external electronic device 202. In this case, the electronic device 101 may retransmit P5 to the external electronic device 202. The external electronic device 202 may transmit an ACK signal to the electronic device 101 in response to receiving P5 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after retransmission of P5, it may be determined that P5 is not transmitted to the external electronic device 202. In this case, the electronic device 101 may retransmit P5 to the external electronic device 202 again. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of P5, it may be determined that P5 is not transmitted to the external electronic device 202. The electronic device 101 may no longer transmit a packet in ISO Interval (3), based on determination that flush point P5 has been reached in ISO Interval (3).

Referring to ISO Interval (1) of FIG. 6B, according to an embodiment, the electronic device 101 (e.g., at least one of the processor 120 or the communication module 190) may transmit Main P0 (e.g., main packet including main compressed data corresponding to a first frame) to the external electronic device 202. The external electronic device 202 may transmit an ACK signal to the electronic device 101 in response to receiving Main P0 from the electronic device 101. The electronic device 101 may receive the ACK signal from the external electronic device 202 within a preconfigured time. If the electronic device 101 receives the ACK signal from the external electronic device 202 within the preconfigured time after transmission of Main P0, it may be determined that Main P0 has been transmitted to the external electronic device 202. The electronic device 101 may transmit Enhanced P0 #1 (e.g., first sub-packet including first sub-compressed data corresponding to the first frame), based on determination that Main P0 has been transmitted to the external electronic device 202. The external electronic device 202 may transmit an ACK signal to the electronic device 101 in response to receiving Enhanced P0 #1 from the electronic device 101. If the electronic device 101 receives the ACK signal from the external electronic device 202 within a preconfigured time after transmission of Enhanced P0 #1, it may be determined that Enhanced P0 #1 has been transmitted to the external electronic device 202. The electronic device 101 may transmit Main P1 (e.g., main packet including main compressed data corresponding to a second frame) to the external electronic device 202, based on determination that flush point P0 has been reached in ISO Interval (1). The external electronic device 202 may transmit an ACK signal to the electronic device 101 in response to receiving Main P1 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after transmission of Main P1, it may be determined that Main P1 is not transmitted to the external electronic device 202. In this case, the electronic device 101 may retransmit Main P1 to the external electronic device 202. The external electronic device 202 may transmit an ACK signal to the electronic device 101 in response to receiving Main P1 from the electronic device 101. The electronic device 101 may receive the ACK signal from the external electronic device 202 within the preconfigured time. If the electronic device 101 receives the ACK signal from the external electronic device 202 within the preconfigured time after retransmission of Main P1, it may be determined that Main P1 has been transmitted to the external electronic device 202. The electronic device 101 may no longer transmit a packet in ISO Interval (1), based on determination that Main P1 has been transmitted to the external electronic device 202. Alternatively, the electronic device 101 may no longer transmit a packet in ISO Interval (1), based on determination that flush point P1 has been reached in ISO Interval (1).

Referring to ISO Interval (2) of FIG. 6B, according to an embodiment, the electronic device 101 may transmit Main P2 (e.g., main packet including main compressed data corresponding to a third frame) to the external electronic device 202. The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of Main P2, it may be determined that Main P2 is not transmitted to the external electronic device 202. In this case, the electronic device 101 may retransmit Main P2 to the external electronic device 202. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of Main P2, it may be determined that Main P2 is not transmitted to the external electronic device 202. The electronic device 101 may transmit Main P3 (e.g., main packet including main compressed data corresponding to a fourth frame) to the external electronic device 202, based on determination that flush point P2 has been reached in ISO Interval (2). The external electronic device 202 may transmit an NACK signal to the electronic device 101 in response to a failure of receiving the packet from the electronic device 101 within a preconfigured time. The electronic device 101 may receive the NACK signal from the external electronic device 202 within the preconfigured time. If the electronic device 101 receives the NACK signal from the external electronic device 202 within the preconfigured time after transmission of Main P3, it may be determined that Main P3 is not transmitted to the external electronic device 202. In this case, the electronic device 101 may retransmit Main P3 to the external electronic device 202. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of Main P3, it may be determined that Main P3 is not transmitted to the external electronic device 202. The electronic device 101 may no longer transmit a packet in ISO Interval (2), based on determination that flush point P3 has been reached in ISO Interval (2).

Referring to ISO Interval (3) of FIG. 6B, according to an embodiment, the electronic device 101 may transmit Main P4 (e.g., main packet including main compressed data corresponding to a fifth frame) to the external electronic device 202. The external electronic device 202 may transmit an ACK signal to the electronic device 101 in response to receiving Main P4 from the electronic device 101. The electronic device 101 may receive the ACK signal from the external electronic device 202 within a preconfigured time. If the electronic device 101 receives the ACK signal from the external electronic device 202 within the preconfigured time after transmission of Main P4, it may be determined that Main P4 has been transmitted to the external electronic device 202. The electronic device 101 may transmit Enhanced P4 #1 (e.g., first sub-packet including first sub-compressed data corresponding to the fifth frame), based on determination that Main P4 has been transmitted to the external electronic device 202. The external electronic device 202 may transmit an ACK signal to the electronic device 101 in response to receiving Enhanced P4 #1 from the electronic device 101. Even if the external electronic device 202 has transmitted the ACK signal to the electronic device 101, the electronic device 101 may fail to receive the signal from the external electronic device 202 within the preconfigured time. If the electronic device 101 has failed to receive a signal from the external electronic device 202 within the preconfigured time after transmission of Enhanced P4 #1, it may be determined that Enhanced P4 #1 is not transmitted to the external electronic device 202. The electronic device 101 may transmit Main P5 (e.g., main packet including main compressed data corresponding to a sixth frame) to the external electronic device 202, based on determination that flush point P4 has been reached in ISO Interval (3). The external electronic device 202 may transmit an ACK signal to the electronic device 101 in response to receiving Main P5 from the electronic device 101. Even if the external electronic device 202 has transmitted the ACK signal to the electronic device 101, the electronic device 101 may fail to receive the signal from the external electronic device 202 within a preconfigured time. If the electronic device 101 has failed to receive a signal from the external electronic device 202 within the preconfigured time after transmission of Main P5, it may be determined that Main P5 is not transmitted to the external electronic device 202. In this case, the electronic device 101 may retransmit Main P5 to the external electronic device 202. The external electronic device 202 may transmit an NACK signal to the electronic device 101 in response to a failure of receiving the packet from the electronic device 101 within the preconfigured time. The electronic device 101 may receive the NACK signal from the external electronic device 202 within the preconfigured time. If the electronic device 101 receives the NACK signal from the external electronic device 202 within the preconfigured time after retransmission of Main P5, it may be determined that Main P5 is not transmitted to the external electronic device 202. The electronic device 101 may no longer transmit a packet in ISO Interval (3), based on determination that flush point P5 has been reached in ISO Interval (3).

FIGS. 7A and 7B are diagrams illustrating an example method for transmitting data to or receiving data from the external electronic device by the electronic device according to various embodiments.

FIG. 7A is a diagram illustrating a comparative example for comparison between various embodiments of transmitting only a main packet including main compressed data corresponding to a specific frame, and FIG. 7B is a diagram illustrating an embodiment of transmitting not only a main packet including main compressed data corresponding to a specific frame but also a sub-packet including sub-compressed data corresponding to the specific frame.

Referring to FIGS. 7A and 7B, according to an embodiment, the electronic device 101 may be a master (M), and an external electronic device 202 may be a slave (S).

FIGS. 7A and 7B illustrate an embodiment in which NSE is configured to 4, BN is configured to 1, and FT is configured to 2. Referring to FIGS. 7A and 7B, NSE is configured to 4, and 4 sub-events may thus exist in one interval. BN is configured to 1, and packets corresponding to one new frame may be thus transmitted in one interval. FT is configured to 2, and packets corresponding to a new frame may be thus transmitted within up to two interval.

Referring to ISO Interval (1) and ISO Interval (2) of FIG. 7A, according to a comparative example, BN is configured to 1, and P0 (e.g., main packet including main compressed data corresponding to a first frame) may be thus transmitted from ISO Interval (1), and since FT is configured to 2, flush point P0 may configured within ISO Interval (2). NSE is configured to 4, and therefore, for example, if it is not determined that P0 has been transmitted to the external electronic device 202 within four sub-events in ISO Interval (1), the electronic device 101 may no longer transmit a packet in ISO Interval (1).

Referring to ISO Interval (2) and ISO Interval (3) of FIG. 7A, according to an comparative example, since BN is configured to 1, P1 (e.g., main packet including main compressed data corresponding to a second frame) may be transmitted from ISO Interval (2), however, it is not determined that P0 has been transmitted to the external electronic device 202 before reaching flush point P0 in ISO Interval (2), and transmission of P1 thus starts in ISO Interval (3) that is after flush point P0 has elapsed. In this case, FT is configured to 2, and flush point P1 corresponding to P1 which may have been transmitted from ISO Interval (2) is thus configured in ISO Interval (3).

Referring to ISO Interval (3) of FIG. 7A, according to the comparative example, BN is configured to 1, and P2 (e.g., main packet including main compressed data corresponding to a third frame) may be thus transmitted from ISO Interval (3). Flush point P1 exists in ISO Interval (3), and the electronic device 101 may thus receive an ACK signal from the external electronic device 202 and may transmit P2 to the external electronic device 202, based on determination that P1 has been transmitted to the external electronic device 202. Since BN is configured to 1, P3 (e.g., main packet including main compressed data corresponding to a fourth frame) may be transmitted from ISO Interval (4), and therefore the electronic device 101 may receive an ACK signal from the external electronic device 202 and may no longer transmit a packet in ISO Interval (3), based on determination that P2 has been transmitted to the external electronic device 202.

Referring to ISO Interval (1), ISO Interval (2), and ISO Interval (3) of FIG. 7B, according to an embodiment, a procedure of transmitting Main P0, Main P1, and Main P2 is similar to a procedure of transmitting P0, P1, and P2 in ISO Interval (1), ISO Interval (2), and ISO Interval (3) of FIG. 7A.

Referring to ISO Interval (3) of FIG. 7B, according to an embodiment, unlike ISO Interval (3) of FIG. 7A, after determination that Main P2 has been transmitted to the external electronic device 202, the electronic device 101 may transmit Enhanced P2 (e.g., sub-packet including sub-compressed data corresponding to a third frame) to the external electronic device 202 using a remaining sub-event (e.g., fourth sub-event).

FIGS. 8A and 8B are diagrams for illustrating an example method for transmitting data to or receiving data from the external electronic device by the electronic device according to various embodiments.

FIG. 8A is a diagram illustrating a comparative example for comparison between various embodiments of transmitting only a main packet including main compressed data corresponding to a specific frame, and FIG. 8B is a diagram illustrating an embodiment of transmitting not only a main packet including main compressed data corresponding to a specific frame but also a sub-packet including sub-compressed data corresponding to the specific frame.

Referring to FIGS. 8A and 8B, according to an embodiment, the electronic device 101 may be a master (M), and an external electronic device 202 may be a slave (S).

FIGS. 8A and 8B illustrate an embodiment in which NSE is configured to 4, BN is configured to 2, and FT is configured to 2. Referring to FIGS. 8A and 8B, NSE is configured to 4, and 4 sub-events may thus exist in one interval. BN is configured to 2, and packets corresponding to two new frames may be transmitted in one interval. FT is configured to 2, and packets corresponding to a new frame may be thus transmitted within up to two interval.

A flush point (e.g., flush point P0, flush point P1, flush point P2, and flush point P3) will be described with reference to ISO Interval (1), ISO Interval (2), and ISO Interval (3) of FIGS. 8A and 8B.

Referring to FIGS. 8A and 8B, BN is configured to 2, and P0 (e.g., main packet including main compressed data corresponding to a first frame) and P1 (e.g., main packet including main compressed data corresponding to a second frame) may be transmitted from ISO Interval (1). Similarly, P2 (e.g., main packet including main compressed data corresponding to a third frame) and P3 (e.g., main packet including main compressed data corresponding to a fourth frame) may be transmitted from ISO Interval (2), and P4 (e.g., main packet including main compressed data corresponding to a fifth frame) and P5 (e.g., main packet including main compressed data corresponding to a sixth frame) may be transmitted from ISO Interval (3).

Referring to FIGS. 8A and 8B, FT is configured to 2, and P0 and P1 may be thus transmitted until ISO Interval (2). Flush point P0 may be configured at the end of a second sub-event of ISO Interval (2), and flush point P1 may be configured at the end of a fourth sub-event of ISO Interval (2). FT is configured to 2, and P2 and P3 may be thus transmitted until ISO Interval (3). Flush point P2 may be configured at the end of a second sub-event of ISO Interval (3), and flush point P3 may be configured at the end of a fourth sub-event of ISO Interval (3).

Referring to ISO Interval (1), ISO Interval (2), and ISO Interval (3) of FIG. 8A, according to a comparative example, the electronic device 101 may transmit P1 to the external electronic device 202 at a third sub-event of ISO Interval (2), based on the fact that transmission of P0 to the external electronic device 202 is not determined until flush point P0 is reached. The electronic device 101 may receive an ACK signal from the external electronic device 202 and may transmit P2 to the external electronic device 202, based on determination that P1 has been transmitted to the external electronic device 202. The electronic device 101 may receive an ACK signal from the external electronic device 202 in ISO Interval (2) and may transmit P3 to the external electronic device 202 in ISO Interval (3), based on determination that P2 has been transmitted to the external electronic device 202. The electronic device 101 may receive an ACK signal from the external electronic device 202 in ISO Interval (3) and may transmit P4 to the external electronic device 202 in ISO Interval (3) on the basis of determination that P3 has been transmitted to the external electronic device 202, and the electronic device 101 may receive an ACK signal from the external electronic device 202 and may transmit P5 to the external electronic device 202 on the basis of determination that P4 has been transmitted to the external electronic device 202. P6 (e.g., main packet including main compressed data corresponding to a seventh frame) may be transmitted from ISO Interval (4), and thus the electronic device 101 may no longer transmit a packet in ISO Interval (3) even if the fourth sub-event of ISO Interval (3) remains.

Referring to ISO Interval (1), ISO Interval (2), and ISO Interval (3) of FIG. 8B, according to an embodiment, a procedure of transmitting Main P0, Main P1, Main P2, Main P3, Main P4, and Main P5 is similar to a procedure of transmitting P0, P1, P2, P3, P4 and P5 in ISO Interval (1), ISO Interval (2), and ISO Interval (3) of FIG. 8A.

Referring to ISO Interval (3) of FIG. 8B, according to an embodiment, unlike ISO Interval (3) of FIG. 8A, after determination that Main P5 has been transmitted to the external electronic device 202, the electronic device 101 may transmit Enhanced P5 (e.g., sub-packet including sub-compressed data corresponding to a sixth frame) to the external electronic device 202 using a remaining sub-event (e.g., fourth sub-event).

FIGS. 9A and 9B are diagrams illustrating an example method for transmitting data to or receiving data from the external electronic device by the electronic device according to various embodiments.

Referring to FIGS. 9A and 9B, according to an embodiment, the electronic device 101 may be a master (e.g., DUT), and the external electronic device 202 may be a slave (e.g., a headset).

In FIGS. 9A and 9B, according to an embodiment, Tesco is a concept similar to the ISO Interval of FIGS. 5A and 5B, and may refer to a period configured for transmission or reception of Tx and Rx packets, and Wesco may refer to a maximum period in Tesco, in which Tx and Rx packets can be retransmitted. For example, FIGS. 9A and 9B are diagrams illustrating an embodiment in which one Tesco includes up to five periods (Wesco) in which retransmission is possible, and two retransmission periods among the periods is used.

FIG. 9A is a diagram illustrating a comparative example for comparison with various examples in which, if transmission of Tx and Rx packets allocated to one Tesco succeeds within the Tesco, additional packet transmission is not performed even if a retransmission period remains in the Tesco, and FIG. 9B is a diagram illustrating an embodiment in which, if transmission of Tx and Rx packets allocated to one Tesco is successful within the Tesco, and a retransmission period of the Tesco remains, Tx and Rx packets allocated to a subsequent Tesco are transmitted using the retransmission period of the Tesco.

Referring to Retransmission (1) of FIG. 9A, according to a comparative example, the electronic device 101 (e.g., at least one of the processor 120 or the communication module 190) may transmit packet T0 to the external electronic device 202 using a first Tesco, and may receive an R0 packet including an ACK signal from the external electronic device 202. In this case, the electronic device 101 may determine that packet T0 has been transmitted to the external electronic device 202. The electronic device 101 may not perform additional packet transmission even if an available retransmission period remains.

Referring to Retransmission (2) of FIG. 9A, according to the comparative example, the electronic device 101 may transmit and receive packets T1 and R1 to and from the external electronic device 202 using a subsequent Tesco. If transmission and reception of packets T1 and R1 fail, the electronic device 101 may transmit and receive packets T1 and R1 using retransmission periods of the Tesco. If transmission and reception of the T1 and R1 packets via available retransmission periods (e.g., two retransmission periods) fail, the electronic device 101 may no longer perform packet transmission. In this case, transmission and reception of packets T1 and R1 fail, and the electronic device 101 and the external electronic device 202 cannot use the T1 and R1 packets.

Referring to Retransmission (3) of FIG. 9A, according to the comparative example, the electronic device may transmit and receive packets T2 and R2 to and from the external electronic device 202 using a subsequent Tesco. If transmission and reception of packets T2 and R2 fail, the electronic device 101 may transmit and receive packets T2 and R2 using retransmission periods of the Tesco. If transmission and reception of packets T2 and R2 are successful using retransmission periods, the electronic device 101 may no longer perform additional packet transmission even if an available retransmission period remains.

Referring to Retransmission (1) of FIG. 9B, according to an embodiment, the electronic device 101 (e.g., at least one of the processor 120 or the communication module 190) may transmit packet TO to the external electronic device 202 using a first Tesco, and may receive an RO packet including an ACK signal from the external electronic device 202. In this case, the electronic device 101 may determine that the TO packet has been transmitted to the external electronic device 202. If it is determined that packet TO has been transmitted to the external electronic device 202 the electronic device 101 may transmit and receive packets T1 and R1 which are subsequent packets using available retransmission periods.

Referring to Retransmission (2) of FIG. 9B, according to an embodiment, the electronic device 101 may transmit and receive packets T1 and R1 to and from the external electronic device 202 using a subsequent Tesco. If transmission and reception of packets T1 and R1 fail, the electronic device 101 may transmit and receive packets T1 and R1 using retransmission periods of the Tesco. If transmission and reception of the T1 and R1 packets via available retransmission periods (e.g., two retransmission periods) fail, the electronic device 101 may no longer perform packet transmission. In this case, in Retransmission (2), although transmission and reception of packets T1 and R1 have failed, the electronic device 101 and the external electronic device 202 may use packets T1 and R1 which have been received in advance in the previous Tesco.

Referring to Retransmission (3) of FIG. 9A, according to an embodiment, the electronic device 101 may transmit and receive packets T2 and R2 to and from the external electronic device 202 using a subsequent Tesco. If transmission and reception of packets T2 and R2 fail, the electronic device 101 may transmit and receive packets T2 and R2 using retransmission periods of the Tesco. If transmission and reception of packets T2 and R2 fail, the electronic device 101 may transmit and receive packets T3 and R3 which are subsequent packets using retransmission periods of the Tesco.

Figure 10:
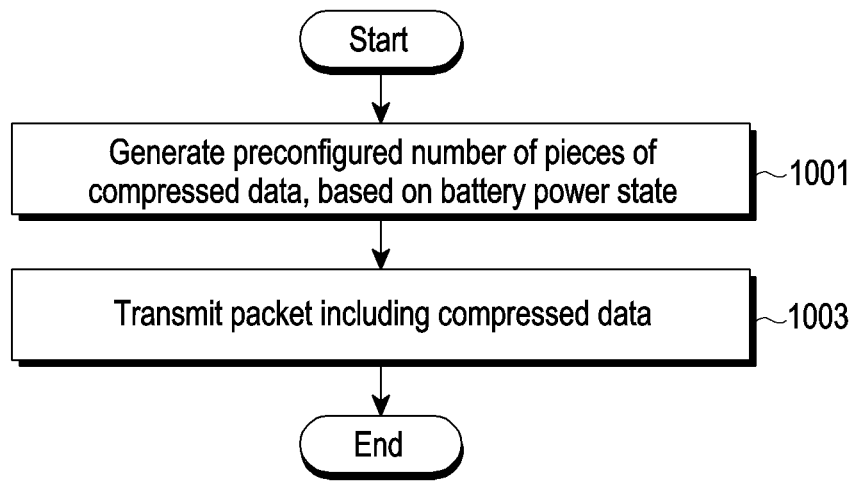
FIG. 10 is a flowchart illustrating an example method of operating the electronic device according to various embodiments.

FIG. 10 is a flowchart illustrating an example method of operating the electronic device according to various embodiments.

Referring to FIG. 10, in operation 1001, according to an embodiment, the electronic device 101 (e.g., at least one of the processor 120 or the communication module 190) may, based on a power state of a battery (e.g., the battery 189 of FIG. 1) of the electronic device 101, encode respective frames included in an audio stream in units of frames so as to generate the preconfigured number of pieces of compressed data corresponding to the respective frames.

According to an embodiment, if a power value of the battery 189 is equal to or greater than a preconfigured first reference value, the electronic device 101 may encode a first frame included in the audio stream so as to generate a preconfigured number (e.g., N) of pieces of compressed data corresponding to the first frame. For example, if the electronic device 101 generates N pieces of compressed data corresponding to the first frame, the electronic device 101 may generate one piece of main compressed data corresponding to the first frame and N-1 pieces of sub-compressed data corresponding to the first frame.

According to an embodiment, if the power value of the battery 189 is smaller than the preconfigured first reference value, the electronic device 101 may encode the first frame included in the audio stream so as to generate a preconfigured number (e.g., M where M is a number smaller than N) of pieces of compressed data corresponding to the first frame. For example, if the electronic device 101 generates M pieces of compressed data corresponding to the first frame, the electronic device 101 may generate one piece of main compressed data corresponding to the first frame and M-1 pieces of sub-compressed data corresponding to the first frame.

According to an embodiment, the preconfigured number of pieces of compressed data to be generated corresponding to a specific frame (e.g., first frame) by the electronic device 101 may be determined based on the power value of the battery 189. For example, if the power value of the battery 189 is smaller than a second reference value that is smaller than the first reference value, the electronic device 101 may encode the first frame included in the audio stream so as to generate a preconfigured number (e.g., L where L is a number smaller than M) of pieces of compressed data corresponding to the first frame.

According to an embodiment, when the electronic device 101 receives power from an external power source, regardless of the power state of the battery 189 of the electronic device 101, the electronic device 101 may encode the first frame included in the audio stream so as to generate a preconfigured number (e.g., N) of pieces of compressed data corresponding to the first frame.

According to an embodiment, the electronic device 101 may receive, from the external electronic device 202, information on a power state of a battery (not shown) of the external electronic device 202. For example, the electronic device 101 may periodically receive, from the external electronic device 202, information on the power state of the battery (not shown) of the external electronic device 202. For example, the electronic device 101 may receive information on the power state of the battery (not shown) of the external electronic device 202 in response to occurrence of a specific event from the external electronic device 202. For example, the electronic device 101 may receive information on the power state of the battery (not shown) of the external electronic device 202 together with an ACK signal or an NACK signal transmitted by the external electronic device 202.

According to an embodiment, the electronic device 101 may, based on information on the power state of the battery (not shown) of the external electronic device 202, encode respective frames included in an audio stream in units of frames so as to generate the preconfigured number of pieces of compressed data corresponding to the respective frames. For example, the electronic device 101 may encode respective frames included in the audio stream in units of frames so as to generate the preconfigured number of pieces of compressed data corresponding to the respective frames, based on information on the power state of the battery (not shown) of the external electronic device 202, the information being received from the external electronic device 202.

According to an embodiment, if a power value of the battery (not shown) of the external electronic device 202 is equal to or greater than a preconfigured first reference value, the electronic device 101 may encode a first frame included in the audio stream so as to generate a preconfigured number (e.g., N) of pieces of compressed data corresponding to the first frame.

According to an embodiment, if the power value of the battery (not shown) of the external electronic device 202 is smaller than the preconfigured first reference value, the electronic device 101 may encode the first frame included in the audio stream so as to generate a preconfigured number (e.g., M where M is a number smaller than N) of pieces of compressed data corresponding to the first frame.

According to an embodiment, the preconfigured number of pieces of compressed data to be generated corresponding to a specific frame (e.g., first frame) by the electronic device 101 may be determined based on the power value of the battery (not shown) of the external electronic device 202. For example, if the power value of the battery (not shown) of the external electronic device 202 is smaller than a second reference value that is smaller than the first reference value, the electronic device 101 may encode the first frame included in the audio stream so as to generate a preconfigured number (e.g., L where L is a number smaller than M) of pieces of compressed data corresponding to the first frame.

According to an embodiment, the preconfigured number of pieces of compressed data to be generated corresponding to a specific frame (e.g., first frame) by the electronic device 101 may be determined based on at least one of the power value of the battery 189 of the electronic device 101 or the power value of the battery (not shown) of the external electronic device 202. For example, if both the power value of the battery 189 of the electronic device 101 and the power value of the battery (not shown) of the external electronic device 202 are equal to or greater than the preconfigured first reference value, the electronic device 101 may encode the first frame included in the audio stream so as to generate the preconfigured number (e.g., N) of pieces of compressed data corresponding to the first frame. For example, if at least one of the power value of the battery 189 of the electronic device 101 or the power value of the battery (not shown) of the external electronic device 202 is smaller than the first reference value, the electronic device 101 may encode the first frame included in the audio stream so as to generate the preconfigured number (e.g., M where M is a number smaller than N) of pieces of compressed data corresponding to the first frame. According to an embodiment, the reference values for the power value of the battery 189 of the electronic device 101 and for the power value of the battery (not shown) of the external electronic device 202 may be configured to be different from each other.

In operation 1003, according to an embodiment, the electronic device 101 may transmit, to the external electronic device 202, a packet including the preconfigured number of pieces of compressed data generated based on the power state of the battery 189. According to an embodiment, the electronic device 101 may transmit, to the external electronic device 202, the preconfigured number of pieces of compressed data generated based on information on the power state of the battery (not shown) of the external electronic device 202. For example, if the electronic device 101 generates N pieces of compressed data corresponding to the first frame, the electronic device 101 may sequentially transmit one piece of main compressed data corresponding to the first frame and N-1 pieces of sub-compressed data corresponding to the first frame with reference to the aforementioned embodiments of FIG. 5 to FIG. 8. For example, if the electronic device 101 generates M pieces of compressed data corresponding to the first frame, the electronic device 101 may sequentially transmit one piece of main compressed data corresponding to the first frame and M-1 pieces of sub-compressed data corresponding to the first frame with reference to the aforementioned embodiments of FIG. 5 to FIG. 8.

Figure 11:
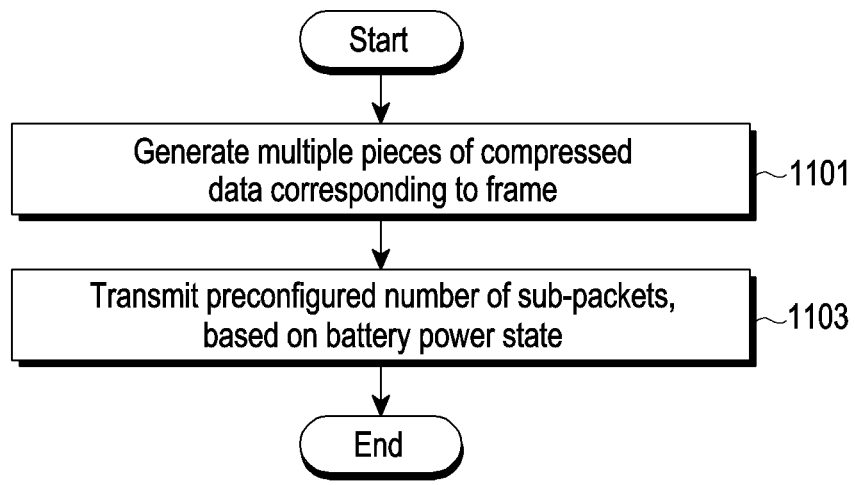
FIG. 11 is a flowchart illustrating an example method of operating the electronic device according to various embodiments.

FIG. 11 is a flowchart illustrating an example method of operating the electronic device according to various embodiments.

Referring to FIG. 11, in operation 1101, according to an embodiment, the electronic device 101 (e.g., at least one of the processor 120 or the communication module 190) may encode respective frames included in an audio stream in units of frames so as to generate multiple pieces (e.g., preconfigured number) of compressed data corresponding to the respective frames. For example, the electronic device 101 may encode a first frame included in the audio stream so as to generate a preconfigured number (e.g., N) of pieces of compressed data corresponding to the first frame.

In operation 1103, according to an embodiment, the electronic device 101 may, based on a power state of the battery (e.g., the battery 189 of FIG. 1) of the electronic device 101, determine the preconfigured number of pieces of compressed data as targets to be transmitted to the external electronic device 202 from among multiple pieces of compressed data generated corresponding to a specific frame and transmit the preconfigured number of sub-packets based on the battery power state. For example, the number of pieces of compressed data to be transmitted to the external electronic device 202 from among the multiple pieces of compressed data generated corresponding to the specific frame may be determined based on the power state of the battery 189.

According to an embodiment, if the power value of the battery 189 is equal to or greater than a preconfigured first reference value, the electronic device 101 may sequentially transmit all compressed data generated corresponding to the specific frame (e.g., first frame), with reference to the aforementioned embodiments of FIG. 5 to FIG. 8. In this case, according to values of ISO Interval, NSE, BN, and FT, all the compressed data generated corresponding to the specific frame may be transmitted, and some of the compressed data generated corresponding to the specific frame may be transmitted. For example, if N pieces of compressed data (e.g., one piece of main compressed data and N-1 pieces of sub-compressed data) have been generated corresponding to the first frame, and the power value of the battery 189 is equal to or greater than the preconfigured first reference value, the electronic device 101 may continuously transmit sub-packets including sub-compressed data corresponding to the first frame if the values of ISO Interval, NSE, BN, and FT indicate that flush point P0 corresponding to the first frame has not yet been reached.

According to an embodiment, if the power value of the battery 189 is smaller than the preconfigured first reference value, the electronic device 101 may sequentially transmit some of compressed data generated corresponding to the specific frame (e.g., first frame), with reference to the aforementioned embodiments of FIG. 5 to FIG. 8. In this case, some of the compressed data generated corresponding to the specific frame may be transmitted according to the values of ISO Interval, NSE, BN, and FT. For example, if N pieces of compressed data (e.g., one piece of main compressed data and N-1 pieces of sub-compressed data) have been generated corresponding to the first frame and the power value of the battery 189 is smaller than the preconfigured first reference value, the electronic device 101 may, even if the values of ISO Interval, NSE, BN, and FT indicate that flush point P0 corresponding to the first frame has not yet been reached, no longer transmit the compressed data generated corresponding to the first frame in a case where the preconfigured number (e.g., M where M is a value smaller than N) of pieces of compressed data, determined based on the power value of the battery 189, have already been transmitted.

According to an embodiment, the maximum number of pieces of compressed data corresponding to a specific frame (e.g., first frame), which will be transmitted by the electronic device 101, may be determined based on the power value of the battery 189. For example, if the power value of the battery 189 is smaller than a second reference value that is smaller than the first reference value, the electronic device 101 may transmit the preconfigured number of pieces of compressed data (e.g., L where L is a value smaller than M) from among N pieces of compressed data (e.g., one piece of main compressed data and N-1 pieces of sub-compressed data) generated corresponding to the first frame.

According to an embodiment, if the electronic device 101 receives power from an external power source, regardless of the power state of the battery 189 of the electronic device 101, the electronic device 101 may sequentially transmit all compressed data generated corresponding to the specific frame (e.g., first frame), with reference to the aforementioned embodiments of FIG. 5 to FIG. 8.

According to an embodiment, the electronic device 101 may receive, from the external electronic device 202, information on a power state of a battery (not shown) of the external electronic device 202. For example, the electronic device 101 may periodically receive, from the external electronic device 202, information on the power state of the battery (not shown) of the external electronic device 202. For example, the electronic device 101 may receive information on the power state of the battery (not shown) of the external electronic device 202 in response to occurrence of a specific event from the external electronic device 202. For example, the electronic device 101 may receive information on the power state of the battery (not shown) of the external electronic device 202 together with an ACK signal or an NACK signal transmitted by the external electronic device 202.

According to an embodiment, the electronic device 101 may, based on information on the power state of the battery (not shown) of the external electronic device 202, determine the preconfigured number of pieces of compressed data as targets to be transmitted to the external electronic device 202 from among multiple pieces of compressed data generated corresponding to a specific frame. For example, the number of pieces of compressed data to be transmitted to the external electronic device 202 from among the multiple pieces of compressed data generated corresponding to the specific frame may be determined based on the power state of the battery (not shown) of the external electronic device 202.

According to an embodiment, if the power value of the battery (not shown) of the external electronic device 202 is equal to or greater than a preconfigured first reference value, the electronic device 101 may sequentially transmit all compressed data generated corresponding to the specific frame (e.g., first frame), with reference to the aforementioned embodiments of FIG. 5 to FIG. 8. For example, if N pieces of compressed data (e.g., one piece of main compressed data and N-1 pieces of sub-compressed data) have been generated corresponding to the first frame and the power value of the battery (not shown) of the external electronic device 202 is equal to or greater than the preconfigured first reference value, the electronic device 101 may continuously transmit sub-packets including sub-compressed data corresponding to the first frame if values of ISO Interval, NSE, BN, and FT indicate that flush point P0 corresponding to the first frame has not yet been reached.

According to an embodiment, if the power value of the battery (not shown) of the external electronic device 202 is smaller than the preconfigured first reference value, the electronic device 101 may sequentially transmit some of compressed data generated corresponding to the specific frame (e.g., first frame), with reference to the aforementioned embodiments of FIG. 5 to FIG. 8. In this case, some of the compressed data generated corresponding to the specific frame may be transmitted according to the values of ISO Interval, NSE, BN, and FT. For example, if N pieces of compressed data (e.g., one piece of main compressed data and N-1 pieces of sub-compressed data) have been generated corresponding to the first frame and the power value of the battery (not shown) of the external electronic device 202 is smaller than the preconfigured first reference value, the electronic device 101 may, even if the values of ISO Interval, NSE, BN, and FT indicate that flush point P0 corresponding to the first frame has not yet been reached, no longer transmit the compressed data generated corresponding to the first frame in a case where the preconfigured number (e.g., M where M is a value smaller than N) of pieces of compressed data, determined based on the power value of the battery (not shown) of the external electronic device 202, have already been transmitted.

According to an embodiment, the maximum number of pieces of compressed data corresponding to a specific frame (e.g., first frame), which will be transmitted by the electronic device 101, may be determined based on at least one of the power state of the battery 189 of the electronic device 101 or the power state of the battery (not shown) of the external electronic device 202. For example, if both the power value of the battery 189 of the electronic device 101 and the power value of the battery (not shown) of the external electronic device 202 are equal to or greater than the first reference value, the electronic device 101 may continuously transmit sub-packets including sub-compressed data corresponding to the specific frame (e.g., first frame) if the values of ISO Interval, NSE, BN, and FT indicate that a flush point (e.g., flush point P0) corresponding to the specific frame (e.g., first frame) has not been reached. For example, if at least one of the power value of the battery 189 of the electronic device 101 or the power value of the battery (not shown) of the external electronic device 202 is smaller than the first reference value, the electronic device 101 may, even if the values of ISO Interval, NSE, BN, and FT indicate that the flush point (e.g., flush point P0) corresponding to the specific frame (e.g., first frame) has not been reached, no longer transmit the compressed data generated corresponding to the specific frame (e.g., first frame) in a case where the preconfigured number (e.g., M where M is a value smaller than N) of pieces of compressed data have already been transmitted. According to an embodiment, the reference values for the power value of the battery 189 of the electronic device 101 and for the power value of the battery (not shown) of the external electronic device 202 may be configured to be different from each other.

Figure 12:
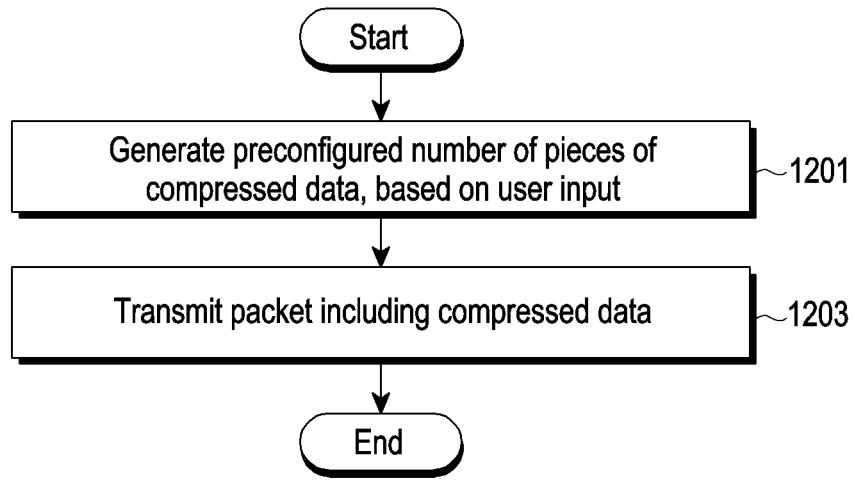
FIG. 12 is a flowchart illustrating an example method of operating the electronic device according to various embodiments.

FIG. 12 is a flowchart illustrating an example method of operating the electronic device according to various embodiments.

Referring to FIG. 12, in operation 1201, according to an embodiment, the electronic device 101 (e.g., at least one of the processor 120 or the communication module 190) may, based on an input of a user, encode respective frames included in an audio stream in units of frames so as to generate a preconfigured number (e.g., preconfigured number) of pieces of compressed data corresponding to the respective frames.

According to an embodiment, the electronic device 101 may, based on a first input of the user (e.g., selecting an ultra-high quality transmission mode), encode a first frame included in the audio stream so as to generate a preconfigured number (e.g., N) of pieces of compressed data corresponding to the first frame. For example, if the electronic device 101 generates N pieces of compressed data corresponding to the first frame, the electronic device 101 may generate one piece of main compressed data corresponding to the first frame and N-1 pieces of sub-compressed data corresponding to the first frame.

According to an embodiment, the electronic device 101 may, based on a second input of the user (e.g., selecting a high quality transmission mode), encode the first frame included in the audio stream so as to generate a preconfigured number (e.g., M where M is a value smaller than N) of pieces of compressed data corresponding to the first frame. For example, if the electronic device 101 generates M pieces of compressed data corresponding to the first frame, the electronic device 101 may generate one piece of main compressed data corresponding to the first frame and M-1 pieces of sub-compressed data corresponding to the first frame.

According to an embodiment, the preconfigured number of pieces of compressed data to be generated corresponding to the specific frame (e.g., first frame) by the electronic device 101 may be determined based on the user input. For example, the electronic device 101 may, based on a third input of the user (e.g., selecting a low quality transmission mode), encode the first frame included in the audio stream so as to generate a preconfigured number (e.g., L where L is a value smaller M) of pieces of compressed data corresponding to the first frame. For example, if the electronic device 101 generates L pieces of compressed data corresponding to the first frame, the electronic device 101 may generate one piece of main compressed data corresponding to the first frame and L-1 pieces of sub-compressed data corresponding to the first frame.

In operation 1203, according to an embodiment, the electronic device 101 may transmit, to the external electronic device 202, a packet including the preconfigured number of pieces of compressed data generated based on the user input. For example, if the electronic device 101 generates N pieces of compressed data corresponding to the first frame, the electronic device 101 may sequentially transmit one piece of main compressed data corresponding to the first frame and N-1 pieces of sub-compressed data corresponding to the first frame with reference to the aforementioned embodiments of FIG. 5 to FIG. 8. For example, if the electronic device 101 generates M pieces of compressed data corresponding to the first frame, the electronic device 101 may sequentially transmit one piece of main compressed data corresponding to the first frame and M-1 pieces of sub-compressed data corresponding to the first frame with reference to the aforementioned embodiments of FIG. 5 to FIG. 8.

Figure 13:
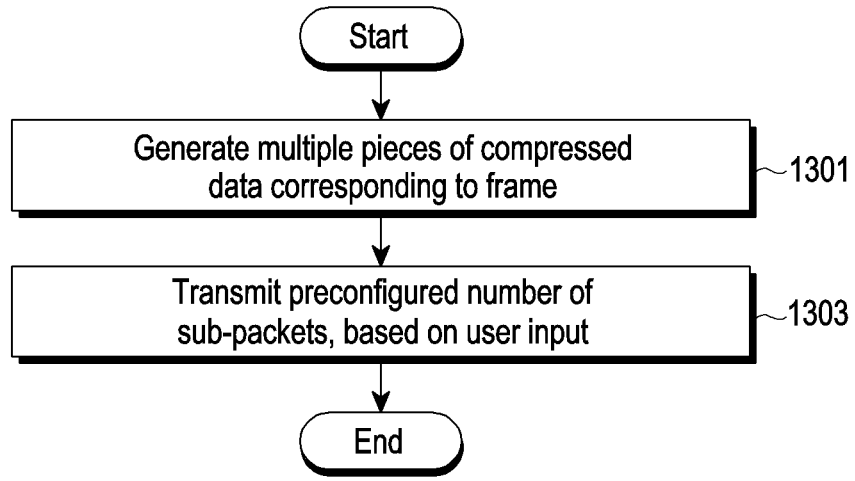
FIG. 13 is a flowchart illustrating an example method of operating the electronic device according to various embodiments.

FIG. 13 is a flowchart illustrating an example method of operating the electronic device according to various embodiments.

Referring to FIG. 13, in operation 1301, according to an embodiment, the electronic device 101 (e.g., at least one of the processor 120 or the communication module 190) may encode respective frames included in an audio stream in units of frames so as to generate multiple pieces (e.g., preconfigured number) of compressed data corresponding to the respective frames. For example, the electronic device 101 may encode a first frame included in the audio stream so as to generate a preconfigured number (e.g., N) of pieces of compressed data corresponding to the first frame.

In operation 1303, according to an embodiment, the electronic device 101 may transmit, based on the user input to the external electronic device 202, the preconfigured number of pieces of compressed data (e.g., sub-packets) from among multiple pieces of compressed data generated corresponding to a specific frame. For example, the number of pieces of compressed data to be transmitted to the external electronic device 202 from among the multiple pieces of compressed data generated corresponding to the specific frame may be determined based on the user input.

According to an embodiment, based on a first input of a user (e.g., selecting the ultra-high quality transmission mode), the electronic device 101 may sequentially transmit all compressed data generated corresponding to the specific frame (e.g., first frame) with reference to the aforementioned embodiments of FIG. 5 to FIG. 8. In this case, according to values of ISO Interval, NSE, BN, and FT, all the compressed data generated corresponding to the specific frame may be transmitted, and some of the compressed data generated corresponding to the specific frame may be transmitted. For example, if N pieces of compressed data (e.g., one piece of main compressed data and N-1 pieces of sub-compressed data) have been generated corresponding to the first frame, and the first input of the user (e.g., selecting the ultra-high quality transmission mode) has been input, the electronic device 101 may continuously transmit sub-packets including sub-compressed data corresponding to the first frame if the values of ISO Interval, NSE, BN, and FT indicate that flush point P0 corresponding to the first frame has not yet been reached.

According to an embodiment, based on a second input of the user (e.g., selecting the high quality transmission mode), the electronic device 101 may sequentially transmit some of the compressed data generated corresponding to the specific frame (e.g., first frame) with reference to the aforementioned embodiments of FIG. 5 to FIG. 8. In this case, some of the compressed data generated corresponding to the specific frame may be transmitted according to the values of ISO Interval, NSE, BN, and FT. For example, if N pieces of compressed data (e.g., one piece of main compressed data and N-1 pieces of sub-compressed data) have been generated corresponding to the first frame, and the second input of the user (e.g., selecting the high quality transmission mode selection) has been input, the electronic device 101 may, even if the values of ISO Interval, NSE, BN, and FT indicate that flush point P0 corresponding to the first frame has not yet been reached, no longer transmit the compressed data generated corresponding to the first frame in a case where the preconfigured number (e.g., M where M is a value smaller than N) of pieces of compressed data, determined based on the second input of the user (e.g., selecting the high quality transmission mode selection), have already been transmitted.

According to an embodiment, the maximum number of pieces of compressed data corresponding to the specific frame (e.g., first frame), which will be transmitted by the electronic device 101, may be determined based on the user input. For example, based on a third input of the user (e.g., selecting the low quality transmission mode), the electronic device 101 may transmit the preconfigured number of pieces of compressed data (e.g., L where L is a value smaller than M) from among N pieces of compressed data (e.g., one piece of main compressed data and N-1 pieces of sub-compressed data) generated corresponding to the first frame.

Figure 14:
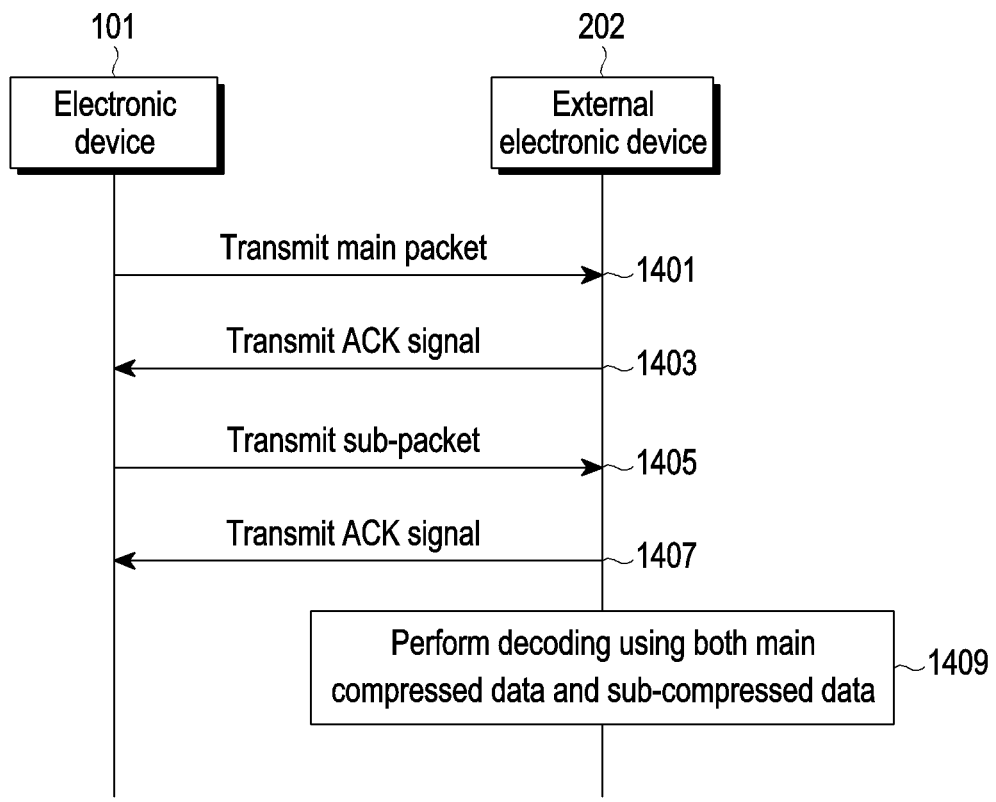
FIG. 14 is a signal flow diagram illustrating an example method of operating the electronic device according to various embodiments.

FIG. 14 is a signal flow diagram illustrating an example method of operating the electronic device according to various embodiments.

According to an embodiment, the electronic device 101 may generate, by encoding a specific frame (e.g., first frame) included in an audio stream, main compressed data corresponding to the specific frame and sub-compressed data corresponding to the specific data.

Referring to FIG. 14, in operation 1401, according to an embodiment, the electronic device 101 (e.g., at least one of the processor 120 or the communication module 190) may transmit a main packet including main compressed data corresponding to the specific frame to the external electronic device 202. For example, the external electronic device 202 (e.g., at least one of a processor (not shown) or a communication module (not shown)) may receive the main packet including main compressed data corresponding to the specific data from the electronic device 101.

In operation 1403, according to an embodiment, the external electronic device 202 may transmit an ACK signal to the electronic device 101 in response to reception of the main packet from the electronic device 101. For example, the external electronic device 202 may transmit the ACK signal and information on a power state of the battery (not shown) of the external electronic device 202 to the electronic device 101 in response to reception of the main packet from the electronic device 101. For example, the electronic device 101 may determine that the main packet has been transmitted to the external electronic device 202, based on reception of the ACK signal from the external electronic device 202.

In operation 1405, according to an embodiment, the electronic device 101 may transmit a sub-packet including sub-compressed data corresponding to the specific frame to the external electronic device 202, based on determination that the main packet has been transmitted to the external electronic device 202. For example, the external electronic device 202 may receive the sub-packet including sub-compressed data corresponding to the specific frame from the electronic device 101.

In operation 1407, according to an embodiment, the external electronic device 202 may transmit an ACK signal to the electronic device 101 in response to reception of the sub-packet from the electronic device 101. For example, the external electronic device 202 may transmit the ACK signal and information on the power state of the battery (not shown) of the external electronic device 202 to the electronic device 101 in response to reception of the sub-packet from the electronic device 101. For example, the electronic device 101 may determine that the sub-packet has been transmitted to the external electronic device 202, based on reception of the ACK signal from the external electronic device 202.

In operation 1409, according to an embodiment, the external electronic device 202 may reconstruct a frame corresponding to the specific frame by decoding the main compressed data included in the main packet and the sub-compressed data included in the sub-packet together.

Figure 15:
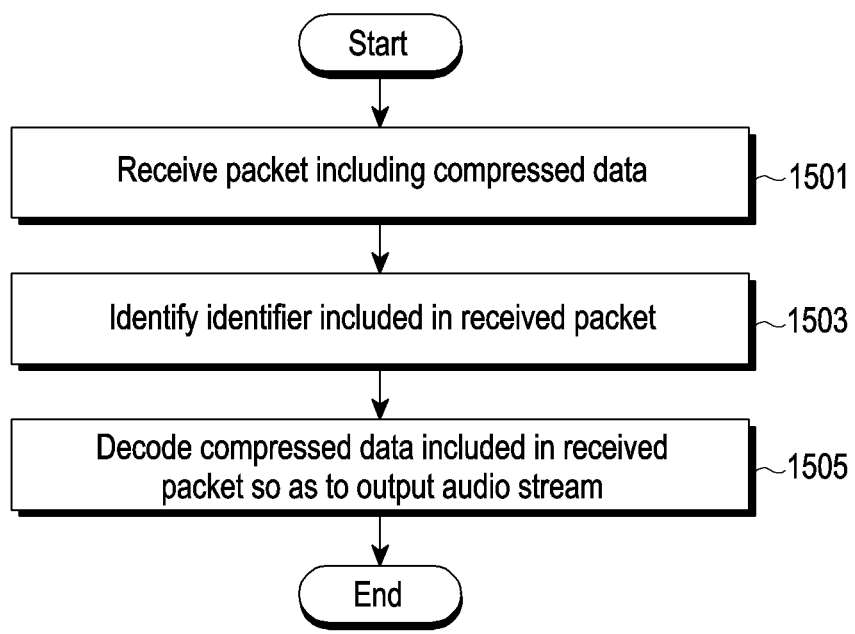
FIG. 15 is a flowchart illustrating an example method of operating the electronic device according to various embodiments.

FIG. 15 is a flowchart illustrating an example method of operating the electronic device according to various embodiments.

Referring to FIG. 15, in operation 1501, according to an embodiment, the external electronic device 202 (e.g., at least one of the processor (not shown) or the communication module (not shown)) may receive a packet including compressed data corresponding to a specific frame from the electronic device 101. For example, the external electronic device 202 may receive a main packet including main compressed data corresponding to the specific frame or a sub-packet including sub-compressed data (e.g., first sub-compressed data) corresponding to the specific frame from the electronic device 101.

In operation 1503, according to an embodiment, the external electronic device 202 may identify an identifier included in the packet received from the electronic device 101. For example, the external electronic device 202 may identify an identifier (e.g., first identifier) included in the main packet received from the electronic device 101. For example, the external electronic device 202 may identify an identifier (e.g., second identifier) included in the sub-packet (e.g., first sub-packet) received from the electronic device 101.

In operation 1505, according to an embodiment, the external electronic device 202 may output an audio stream by decoding compressed data included in the packet received from the electronic device 101. For example, the external electronic device 202 may output the audio stream by decoding the main compressed data included in the main packet received from the electronic device 101. For example, the external electronic device 202 may output the audio stream by performing decoding using both the main compressed data included in the main packet and the sub-compressed data (e.g., first sub-compressed data) included in the sub-packet (e.g., first sub-packet), which are received from the electronic device 101. For example, the external electronic device 202 may output the audio stream by performing decoding using both the main compressed data included in the main packet and the sub-compressed data (e.g., first sub-compressed data) included in the sub-packet (e.g., first sub-packet), based on identification that the identifier (e.g., first identifier) included in the main packet and the identifier (e.g., second identifier) included in the sub-packet (e.g., first sub-packet) correspond to the specific frame, the main packet and the sub-packet being received from the electronic device 101. For example, when at least one main packet and multiple sub-packets are received, the external electronic device 202 may output an audio stream by performing decoding using both main compressed data included in the at least one main packet and multiple pieces of sub-compressed data included in the multiple sub-packets, based on identification that an identifier included in the at least one main packet and identifiers included in the multiple sub-packets correspond to the specific frame. Outputting an audio stream may indicate generation of a frame corresponding to a specific frame corresponding to decoded compressed data.

Figure 16:
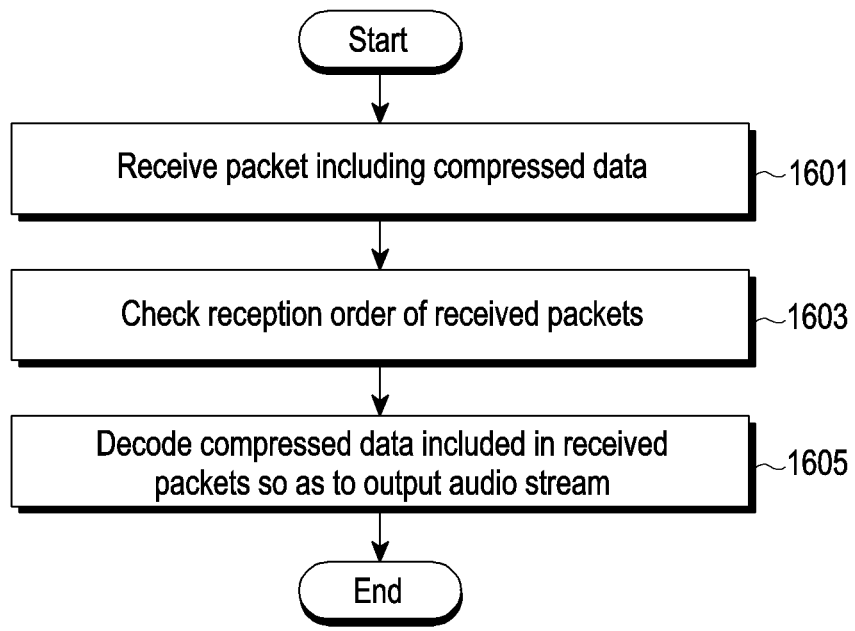
FIG. 16 is a flowchart illustrating an example method of operating the electronic device according to various embodiments.

FIG. 16 is a flowchart illustrating an example method of operating the electronic device according to various embodiments.

Referring to FIG. 16, in operation 1601, according to an embodiment, the external electronic device 202 (e.g., at least one of the processor (not shown) or the communication module (not shown)) may receive a packet including compressed data corresponding to a specific frame from the electronic device 101. For example, the external electronic device 202 may receive a main packet including main compressed data corresponding to the specific frame or a sub-packet including sub-compressed data (e.g., first sub-compressed data) corresponding to the specific frame from the electronic device 101.

In operation 1603, according to an embodiment, the external electronic device 202 may check a reception order of the packets received from the electronic device 101. For example, the external electronic device 202 may check the reception order of the main packet and the sub-packet received from the electronic device 101.

In operation 1605, according to an embodiment, the external electronic device 202 may output an audio stream by decoding compressed data included in the packets received from the electronic device 101. For example, the external electronic device 202 may check the reception order of the main packet and the sub-packet (e.g., first sub-packet) which are received from the electronic device 101, so as to output the audio stream by performing decoding using both the main compressed data corresponding to the specific frame and sub-compressed data (e.g., first sub-compressed data) corresponding to the specific frame, based on identification that the main packet includes the main compressed data corresponding to the specific frame and that the sub-packet (e.g., first sub-packet) includes the sub-compressed data (e.g., first sub-compressed data) corresponding to the specific frame. For example, when at least one main packet and multiple sub-packets are received, the external electronic device 202 may output the audio stream by performing decoding using both main compressed data included in the at least one main packet and multiple pieces of sub-compressed data included in the multiple sub-packets, by checking the reception order of the at least one main packet and the multiple sub-packets. For example, the external electronic device 202 may determine a type of compressed data (e.g., main compressed data or sub-compressed data corresponding to the specific frame) included in the received packet, based on the reception order of the received packets and initial parameters (e.g., values of BN, FT, NSE, and Interval).

Figure 17:
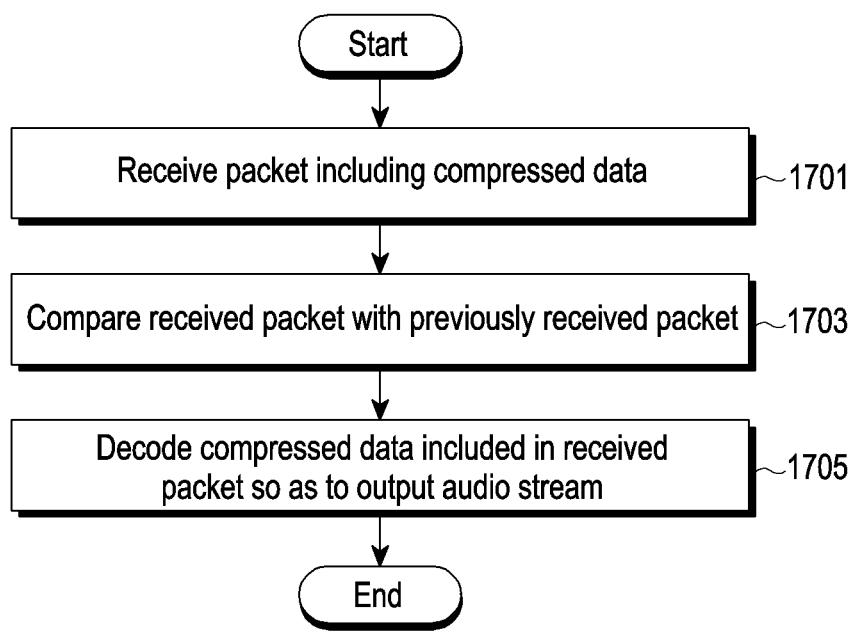
FIG. 17 is a flowchart illustrating an example method of operating the electronic device according to various embodiments.

FIG. 17 is a flowchart illustrating an example method of operating the electronic device according to various embodiments.

Referring to FIG. 17, in operation 1701, according to an embodiment, the external electronic device 202 (e.g., at least one of the processor (not shown) or the communication module (not shown)) may receive a packet including compressed data corresponding to a specific frame from the electronic device 101. For example, the external electronic device 202 may receive a main packet including main compressed data corresponding to the specific frame or a sub-packet including sub-compressed data (e.g., first sub-compressed data) corresponding to the specific frame from the electronic device 101.

In operation 1703, according to an embodiment, the external electronic device 202 may compare the packet received from the electronic device 101 with a previously received packet. For example, the external electronic device 202 may compare the packet currently received from the electronic device 101 with a packet received immediately before the current packet from the electronic device 101.

In operation 1705, according to an embodiment, the external electronic device 202 may output an audio stream by decoding compressed data included in the packet received from the electronic device 101. For example, the external electronic device 202 may compare the main packet and the sub-packet (e.g., first sub-packet) which are received from the electronic device 101, so as to output the audio stream by performing decoding using both the main compressed data corresponding to the specific frame and sub-compressed data (e.g., first sub-compressed data) corresponding to the specific frame, based on identification that the main packet includes the main compressed data corresponding to the specific frame and that the sub-packet (e.g., first sub-packet) includes the sub-compressed data (e.g., first sub-compressed data) corresponding to the specific frame. For example, when at least one main packet and multiple sub-packets are received, the external electronic device 202 may output the audio stream by performing decoding using both main compressed data included in the at least one main packet and multiple pieces of sub-compressed data included in the multiple sub-packets, by comparing the at least one main packet with the multiple sub-packets.

Figure 18:
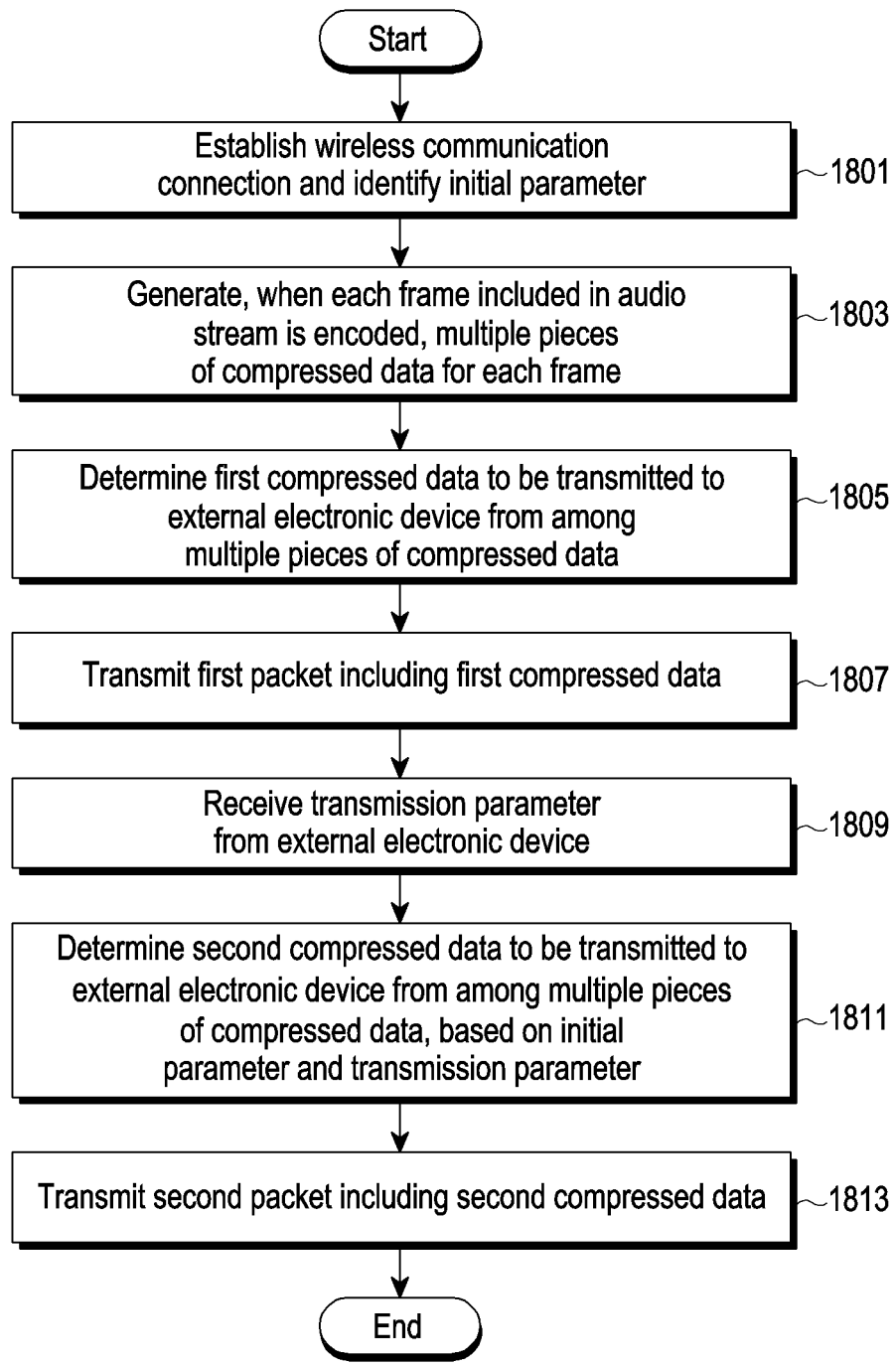
FIG. 18 is a flowchart illustrating an example method of operating the electronic device according to various embodiments.

FIG. 18 is a flowchart illustrating an example method of operating the electronic device according to various embodiments.

Referring to FIG. 18, in operation 1801, according to an embodiment, the electronic device 101 (e.g., at least one of the processor 120 or the communication module 190) may establish a wireless communication connection between the electronic device 101 and the external electronic device 202, and may identify an initial parameter (e.g., BN, FT, NSE, and ISO Interval (or Tesco, Wesco)). For example, the electronic device 101 may transmit information on the initial parameter to the external electronic device 202 via the wireless communication connection. According to an embodiment, the electronic device 101 may transmit information on a reconfigured initial parameter to the external electronic device 202 in a procedure of transmitting data to or receiving data from the external electronic device 202 via the wireless communication connection.

In operation 1803, according to an embodiment, the electronic device 101 may generate, when encoding respective frames included in an audio stream, multiple pieces of compressed data corresponding to the respective frames. For example, the electronic device 101 may generate, when encoding respective frames included in the audio stream, main compressed data and multiple pieces of sub-compressed data for each of the frames. For example, the electronic device 101 may generate, by encoding respective frames included in the audio stream, at least one main compressed data and at least one sub-compressed data corresponding to each frame. For example, the electronic device 101 may generate, by encoding a first frame included in the audio stream, main compressed data and sub-compressed data (e.g., first sub-compressed data) which correspond to the first frame, and may generate, by encoding a second frame adjacent to the first frame included in the audio frame, main compressed data and sub-compressed data (e.g., first sub-compressed data) which correspond to the second frame.

In operation 1805, according to an embodiment, the electronic device 101 may determine first compressed data to be transmitted to the external electronic device 202 from among multiple pieces of compressed data. For example, the electronic device 101 may determine main compressed data corresponding to the first frame to be first compressed data to be transmitted to the external electronic device 202 from among the multiple pieces of compressed data.

In operation 1807, according to an embodiment, the electronic device 101 may transmit, to the external electronic device 202, a first packet including the first compressed data determined to be transmitted to the external electronic device 202. For example, the electronic device 101 may transmit the first packet including main compressed data corresponding to the first frame to the external electronic device 202. For example, the electronic device 101 may transmit the first packet including main compressed data corresponding to the first frame to the external electronic device 202 via a transceiver (e.g., the transceiver 217 of FIG. 2) on the basis of the wireless communication connection.

In operation 1809, according to an embodiment, the electronic device 101 may receive a transmission parameter (e.g., ACK signal or NACK signal) from the external electronic device 202. For example, the electronic device 101 may receive the transmission parameter (e.g., ACK signal or NACK signal) from the external electronic device 202 via the transceiver 217 on the basis of the wireless communication connection. For example, the electronic device 101 may receive the transmission parameter (e.g., ACK signal or NACK signal) from the external electronic device 202 within a preconfigured time after transmitting the packet (e.g., first packet including main compressed data corresponding to the first frame) to the external electronic device 202. For example, the electronic device 101 may receive, from the external electronic device 202, an ACK signal transmitted in response to reception of the packet (e.g., first packet including main compressed data corresponding to the first frame) by the external electronic device 202. For example, the electronic device 101 may receive, from the external electronic device 202, an NACK signal transmitted in response to a failure of receiving the packet (e.g., first packet including main compressed data corresponding to the first frame) by the external electronic device 202.

In operation 1811, according to an embodiment, the electronic device 101 may determine second compressed data to be transmitted to the external electronic device 202 from among the multiple pieces of compressed data, based on the initial parameter and the transmission parameter. For example, the electronic device 101 may determine sub-compressed data (e.g., first sub-compressed data) corresponding to the first frame to be second compressed data to be transmitted to the external electronic device among the multiple pieces of compressed data, based on the initial parameter and the transmission parameter. For example, the electronic device 101 may determine sub-compressed data (e.g., first sub-compressed data) corresponding to the first frame to be second compressed data to be transmitted to the external electronic device 202, based on determining, by receiving the transmission parameter (e.g., ACK signal), that the main compressed data corresponding to the first frame has been transmitted, and determining that flushing point P0 (e.g., end point at which the packet including compressed data corresponding to the first frame is no longer transmitted) corresponding to the initial parameter (e.g., BN, FT, NSE, and ISO Interval) has not been reached. For example, the electronic device 101 may determine main compressed data corresponding to the second frame adjacent to the first frame to be second compressed data to be transmitted to the external electronic device 202, based on determining, by receiving the transmission parameter (e.g., ACK signal), that the main compressed data corresponding to the first frame has been transmitted, and determining that flushing point P0 (e.g., end point at which the packet including compressed data corresponding to the first frame is no longer transmitted) corresponding to the initial parameter (e.g., BN, FT, NSE, and ISO Interval) has been reached.

In operation 1813, according to an embodiment, the electronic device 101 may transmit, to the external electronic device 202, a second packet including the second compressed data determined to be transmitted to the external electronic device 202. For example, the electronic device 101 may transmit the second packet, which includes the second compressed data determined to be transmitted to the external electronic device 202, to the external electronic device 202 via the transceiver 217 on the basis of the wireless communication connection.

According to various example embodiments, an electronic device (e.g., the electronic device 101) may include: a transceiver; and at least one processor, wherein the at least one processor is configured to: control the electronic device to establish a wireless communication connection between the electronic device and an external electronic device (e.g., the external electronic device 202), generate, by encoding a first frame included in an audio stream, multiple pieces of compressed data corresponding to the first frame, transmit a first packet, including main compressed data corresponding to the first frame from among the multiple pieces of compressed data, to the external electronic device via the transceiver based on the wireless communication connection, and based on a first signal being received from the external electronic device via the transceiver based on the wireless communication connection within a specified time after transmission of the first packet, transmit a second packet, including first sub-compressed data corresponding to the first frame from among the multiple pieces of compressed data, to the external electronic device via the transceiver based on the wireless communication connection.

According to various example embodiments, the at least one processor of the electronic device (e.g., the electronic device 101) may be configured to, based on a second signal being received from the external electronic device using the transceiver based on the wireless communication connection within the specified time after transmission of the first packet, retransmit the first packet including the main compressed data corresponding to the first frame to the external electronic device via the transceiver based on the wireless communication connection.

According to various example embodiments, the at least one processor of the electronic device (e.g., the electronic device 101) may be configured to, based on the specified time elapsing without receiving a signal from the external electronic device after transmission of the first packet, retransmit the first packet including the main compressed data corresponding to the first frame to the external electronic device via the transceiver based on the wireless communication connection.

According to various example embodiments, the external electronic device (e.g., the external electronic device 202) may be configured to generate a second frame corresponding to the first frame by performing decoding using both the main compressed data and the first sub-compressed data.

According to various example embodiments, the first packet including the main compressed data includes a first identifier corresponding to the first frame, the second packet including the first sub-compressed data includes a second identifier corresponding to the first frame, and the external electronic device (e.g., the external electronic device 202) may be configured to perform decoding using both the main compressed data and the first sub-compressed data based on identification that the first packet includes the first identifier, and that the second packet includes the second identifier.

According to various example embodiments, the at least one processor of the electronic device (e.g., the electronic device 101) may be configured to generate, by encoding the first frame included in the audio stream, a specified number of pieces of compressed data corresponding to the first frame.

According to various example embodiments, the electronic device (e.g., the electronic device 101) may further include a battery, and the at least one processor may be configured to determine the specified number based on a power state of the battery.

According to various example embodiments, the electronic device (e.g., the electronic device 101) may further include a battery, and the at least one processor may be configured to, based on the first signal being received from the external electronic device via the transceiver based on the wireless communication connection within the specified time after transmission of the first packet, determine whether to transmit the second packet including the first sub-compressed data to the external electronic device, based on a power state of the battery.

According to various example embodiments, the at least one processor of the electronic device (e.g., the electronic device 101) may be configured to, based on a power value of the battery being equal to or greater than a specified value, determine to transmit the second packet including the first sub-compressed data to the external electronic device, and based on the power value of the battery being less than the specified value, determine to not transmit the second packet including the first sub-compressed data to the external electronic device, and transmit a third packet to the external electronic device via the transceiver based on the wireless communication connection, wherein the third packet includes main compressed data corresponding to a third frame adjacent to the first frame included in the audio stream from among multiple pieces of compressed data corresponding to the third frame, generated by encoding the third frame.

According to various example embodiments, the at least one processor of the electronic device (e.g., the electronic device 101) may be configured to, based on the first signal being received from the external electronic device via the transceiver based on the wireless communication connection within the specified time after transmission of the first packet, determine whether to transmit the second packet including the first sub-compressed data to the external electronic device, based on information on a power state of a battery of the external electronic device, which has been received together with the first signal.

According to various example embodiments, the at least one processor of the electronic device (e.g., the electronic device 101) may be configured to determine whether to transmit the second packet including the first sub-compressed data to the external electronic device, based on an initial parameter identified during establishment of the wireless communication connection and a transmission parameter received from the external electronic device via the transceiver.

According to various example embodiments, the at least one processor of the electronic device (e.g., the electronic device 101) may be configured to, based on the first signal being received from the external electronic device via the transceiver based on the wireless communication connection within the specified time after transmission of the first packet, determine whether to transmit the second packet including the first sub-compressed data to the external electronic device, based on whether a reference time has elapsed.

According to various example embodiments, an electronic device (e.g., external electronic device 202) may include: a transceiver; and at least one processor, wherein the at least one processor is configured to: control the electronic device to establish a wireless communication connection between the electronic device and an external electronic device (e.g., electronic device 101), receive a first packet, including main compressed data corresponding to a first frame included in an audio stream from among multiple pieces of compressed data generated by encoding the first frame, from the external electronic device via the transceiver based on the wireless communication connection, transmit a first response signal to the external electronic device via the transceiver based on the wireless communication connection in response to reception of the first packet, receive a second packet, including first sub-compressed data corresponding to the first frame from among the multiple pieces of compressed data, from the external electronic device via the transceiver based on the wireless communication connection, transmit a second response signal to the external electronic device via the transceiver based on the wireless communication connection in response to reception of the second packet, and generate a second frame corresponding to the first frame by performing decoding using both the main compressed data and the first sub-compressed data.

According to various example embodiments, the at least one processor of the electronic device (e.g., the external electronic device 202) may be configured to: identify a first identifier included in the first packet and a second identifier included in the second packet, and perform decoding using both the main compressed data and the first sub-compressed data, based on identification that the first identifier and the second identifier correspond to the first frame.

According to various example embodiments, the at least one processor of the electronic device (e.g., the external electronic device 202) may be configured to perform decoding using both the main compressed data and the first sub-compressed data based on identifying, based on a reception order of the first packet and the second packet, that the first packet includes the main compressed data corresponding to the first data, and the second packet includes the first sub-compressed data corresponding to the first frame.

According to various example embodiments, the at least one processor of the electronic device (e.g., the external electronic device 202) may be configured to perform decoding using both the main compressed data and the first sub-compressed data based on identifying, based on a result of comparing the first packet with the second packet, that the first packet includes the main compressed data corresponding to the first frame and the second packet includes the first sub-compressed data corresponding to the first frame.

According to various example embodiments, the at least one processor of the electronic device (e.g., the external electronic device 202) may be configured to determine whether a reference time has elapsed, and generate a second frame corresponding to the first frame by performing decoding using both the main compressed data and the first sub-compressed data based on the elapsing of the reference time.

According to various example embodiments, the electronic device (e.g., the external electronic device 202) may further include a battery, and the at least one processor of the electronic device (e.g., the external electronic device 202) may be configured to transmit information on a power state of the battery together with the first response signal or the second response signal to the external electronic device via the transceiver based on the wireless communication connection.

According to various example embodiments, an electronic device (e.g., the electronic device 101) may include: a transceiver; and at least one processor, wherein the at least one processor is configured to: control the electronic device to establish a wireless communication connection between the electronic device and an external electronic device (e.g., the external electronic device 202), identify an initial parameter, generate multiple pieces of compressed data by encoding respective frames included in an audio stream in units of frames, determine first compressed data to be transmitted to the external electronic device from among the multiple pieces of compressed data, transmit a first packet including the first compressed data to the external electronic device via the transceiver based on the wireless communication connection, receive a transmission parameter from the external electronic device via the transceiver based on the wireless communication connection, determine second compressed data to be transmitted to the external electronic device from among the multiple pieces of compressed data based on the initial parameter and the transmission parameter, and transmit a second packet including the second compressed data to the external electronic device via the transceiver based on the wireless communication connection.

According to various example embodiments, the at least one processor of the electronic device (e.g., the electronic device 101) may be configured to, based on the transmission parameter being received from the external electronic device via the transceiver based on the wireless communication connection after transmission of the first packet, determine whether to transmit the second packet including the second sub-compressed data to the external electronic device, based on whether a reference time has elapsed.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a transceiver; and
at least one processor, wherein the at least one processor is configured to:
control the electronic device to establish a wireless communication connection between the electronic device and an external electronic device;
generate, by encoding a first frame included in an audio stream, multiple pieces of compressed data corresponding to the first frame;
transmit a first packet, comprising main compressed data corresponding to the first frame from among the multiple pieces of compressed data, to the external electronic device via the transceiver based on the wireless communication connection; and
based on a first signal being received from the external electronic device via the transceiver based on the wireless communication connection within a specified time after transmission of the first packet, transmit a second packet, comprising first sub-compressed data corresponding to the first frame from among the multiple pieces of compressed data, to the external electronic device via the transceiver based on the wireless communication connection.

2. The electronic device of claim 1, wherein the at least one processor is configured to, based on a second signal being received from the external electronic device using the transceiver based on the wireless communication connection within the specified time after transmission of the first packet, retransmit the first packet comprising the main compressed data corresponding to the first frame to the external electronic device via the transceiver based on the wireless communication connection.

3. The electronic device of claim 1, wherein the at least one processor is configured to, based on the specified time elapsing without receiving a signal from the external electronic device after transmission of the first packet, retransmit the first packet comprising the main compressed data corresponding to the first frame to the external electronic device via the transceiver based on the wireless communication connection.

4. The electronic device of claim 1, wherein the external electronic device is configured to generate a second frame corresponding to the first frame by performing decoding using both the main compressed data and the first sub-compressed data.

5. The electronic device of claim 4, wherein: the first packet comprising the main compressed data comprises a first identifier corresponding to the first frame, and the second packet comprising the first sub-compressed data comprises a second identifier corresponding to the first frame; and
the external electronic device is configured to perform decoding using both the main compressed data and the first sub-compressed data based on identifying that the first packet comprises the first identifier, and that the second packet comprises the second identifier.

6. The electronic device of claim 1, wherein the at least one processor is configured to generate, by encoding the first frame included in the audio stream, a specified number of pieces of compressed data corresponding to the first frame.

7. The electronic device of claim 6, wherein: the electronic device further comprises a battery; and
the at least one processor is configured to determine the specified number based on a power state of the battery.

8. The electronic device of claim 1, wherein: the electronic device further comprises a battery; and
the at least one processor is configured to, based on the first signal being received from the external electronic device via the transceiver based on the wireless communication connection within the specified time after transmission of the first packet, determine whether to transmit the second packet comprising the first sub-compressed data to the external electronic device, based on a power state of the battery.

9. The electronic device of claim 8, wherein the at least one processor is configured to: based on a power value of the battery being equal to or greater than a specified value, determine to transmit the second packet comprising the first sub-compressed data to the external electronic device; and
based on the power value of the battery being less than the specified value, determine to not transmit the second packet comprising the first sub-compressed data to the external electronic device, and transmit a third packet to the external electronic device via the transceiver based on the wireless communication connection, wherein the third packet comprises main compressed data corresponding to a third frame adjacent to the first frame included in the audio stream from among multiple pieces of compressed data corresponding to the third frame, which are generated by encoding the third frame.

10. The electronic device of claim 1, wherein the at least one processor is configured to, based on the first signal being received from the external electronic device via the transceiver based on the wireless communication connection within the specified time after transmission of the first packet, determine whether to transmit the second packet comprising the first sub-compressed data to the external electronic device, based on information on a power state of a battery of the external electronic device, received together with the first signal.

11. The electronic device of claim 1, wherein the at least one processor is configured to determine whether to transmit the second packet comprising the first sub-compressed data to the external electronic device, based on an initial parameter identified during establishing of the wireless communication connection and a transmission parameter received from the external electronic device via the transceiver.

12. The electronic device of claim 1, wherein the at least one processor is configured to, based on the first signal being received from the external electronic device via the transceiver based on the wireless communication connection within the specified time after transmission of the first packet, determine whether to transmit the second packet comprising the first sub-compressed data to the external electronic device, based on whether a reference time has elapsed.

13. An electronic device comprising: a transceiver; and
at least one processor, wherein the at least one processor is configured to:
control the electronic device to establish a wireless communication connection between the electronic device and an external electronic device;
receive a first packet, comprising main compressed data corresponding to a first frame included in an audio stream from among multiple pieces of compressed data generated by encoding the first frame, from the external electronic device via the transceiver based on the wireless communication connection;

transmit a first response signal to the external electronic device via the transceiver based on the wireless communication connection in response to reception of the first packet;

receive a second packet, comprising first sub-compressed data corresponding to the first frame from among the multiple pieces of compressed data, from the external electronic device via the transceiver based on the wireless communication connection;

transmit a second response signal to the external electronic device via the transceiver based on the wireless communication connection in response to reception of the second packet; and generate a second frame corresponding to the first frame by performing decoding using both the main compressed data and the first sub-compressed data.

14. The electronic device of claim 13, wherein the at least one processor is configured to:

identify a first identifier included in the first packet and a second identifier included in the second packet; and perform decoding using both the main compressed data and the first sub-compressed data, based on identification that the first identifier and the second identifier correspond to the first frame.

15. The electronic device of claim 13, wherein the at least one processor is configured to perform decoding using both the main compressed data and the first sub-compressed data based on identifying, based on a reception order of the first packet and the second packet, that the first packet includes the main compressed data corresponding to the first data, and the second packet includes the first sub-compressed data corresponding to the first frame.

16. The electronic device of claim 13, wherein the at least one processor is configured to perform decoding using both the main compressed data and the first sub-compressed data based on identifying, based on a result of comparing the first packet with the second packet, that the first packet comprises the main compressed data corresponding to the first frame and the second packet comprises the first sub-compressed data corresponding to the first frame.

17. The electronic device of claim 13, wherein the at least one processor is configured to:

determine whether a reference time has elapsed; and generate a second frame corresponding to the first frame by performing decoding using both the main compressed data and the first sub-compressed data based on the elapsing of the reference time.

18. The electronic device of claim 13, wherein the electronic device further includes a battery, and the at least one processor is configured to transmit information on a power state of the battery together with the first response signal or the second response signal to the external electronic device via the transceiver based on the wireless communication connection.

19. An electronic device comprising:

a transceiver; and at least one processor, wherein the at least one processor is configured to:

control the electronic device to establish a wireless communication connection between the electronic device and an external electronic device, and identify an initial parameter;

generate multiple pieces of compressed data by encoding respective frames included in an audio stream in units of frames;

determine first compressed data to be transmitted to the external electronic device from among the multiple pieces of compressed data;

transmit a first packet comprising the first compressed data to the external electronic device via the transceiver based on the wireless communication connection;

receive a transmission parameter from the external electronic device via the transceiver based on the wireless communication connection;

determine second compressed data to be transmitted to the external electronic device from among the multiple pieces of compressed data based on the initial parameter and the transmission parameter; and transmit a second packet comprising the second compressed data to the external electronic device via the transceiver based on the wireless communication connection.

20. The electronic device of claim 19, wherein the at least one processor is configured to, based on the transmission parameter being received from the external electronic device via the transceiver based on the wireless communication connection after transmission of the first packet, determine whether to transmit the second packet including the second sub-compressed data to the external electronic device, based on whether a reference time has elapsed.

* * * * *